US012361899B2

(12) United States Patent
Sasaki et al.

(10) Patent No.: US 12,361,899 B2
(45) Date of Patent: Jul. 15, 2025

(54) DISPLAY SYSTEM AND ELECTRONIC DEVICE

(71) Applicant: SEIKO EPSON CORPORATION, Tokyo (JP)

(72) Inventors: Yota Sasaki, Matsumoto (JP); Hironori Kobayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/489,047

(22) Filed: Oct. 18, 2023

(65) Prior Publication Data

US 2024/0135890 A1 Apr. 25, 2024
US 2024/0233659 A9 Jul. 11, 2024

(30) Foreign Application Priority Data

Oct. 19, 2022 (JP) ................................ 2022-167571

(51) Int. Cl.
*G09G 3/34* (2006.01)

(52) U.S. Cl.
CPC ... *G09G 3/3426* (2013.01); *G09G 2320/0626* (2013.01)

(58) Field of Classification Search
CPC . G09G 3/3426; G09G 2320/0626; G09G 3/36
See application file for complete search history.

(56) References Cited

U.S. PATENT DOCUMENTS 10,276,130 B1 * 4/2019 Richards .............. G09G 3/3208
11,436,987 B1 * 9/2022 Kim ......................... G09G 3/36
11,538,425 B2 * 12/2022 Inoue ....................... G09G 3/32
2012/0320107 A1 * 12/2012 Murakami ........... G09G 3/3611 345/102
2018/0217447 A1 8/2018 Notoshi et al.
2019/0180698 A1 * 6/2019 Gu ......................... G09G 3/342
2020/0051484 A1 2/2020 Yashiki

FOREIGN PATENT DOCUMENTS

JP 2013-054195 A 3/2013
JP 2013-222515 A 10/2013
JP 2018-124458 A 8/2018
JP 2020-027273 A 2/2020

* cited by examiner

*Primary Examiner* — Bryan Earles
(74) *Attorney, Agent, or Firm* — Harness, Dickey & Pierce, P.L.C.

(57) ABSTRACT

A display device includes a display panel and a backlight device. A display system includes: a display driver; a light source driver that drives the backlight device, based on luminance information that sets a luminance of a plurality of light source elements; and a display controller. The light source driver causes the plurality of light source elements to emit light, based on a light-emission frame update that is faster than an image frame update. The light source driver causes the plurality of light source elements to emit light in an i-th light-emission frame. At this point, the luminance information of the light source element corresponding to a scan area scanned by the display driver in the i-th light-emission frame, of the plurality of light source elements, is updated, based on image data in the scan area at a timing before the i-th light-emission frame.

10 Claims, 32 Drawing Sheets

FIG. 5

IMAGE FRAME FIk

LIGHT-EMISSION FRAME FL4

DISPLAY PANEL

| | | | |
|---|---|---|---|
| GL1 | IM1(k) | DISPLAY | AR1 |
| GL2 | IM1(k) | DISPLAY | |
| GL3 | IM2(k) | DISPLAY | AR2 |
| GL4 | IM2(k) | DISPLAY | |
| GL5 | IM3(k) | DISPLAY | AR3 |
| GL6 | IM3(k) | DISPLAY | |
| GL7 | IM4(k) | UPDATE | AR4 |
| GL8 | IM4(k) | UPDATE | |

LIGHT SOURCE DRIVER

| | | |
|---|---|---|
| LG11 | B11(k+1) | UPDATE |
| LG12 | B12(k+1) | UPDATE |
| LG21 | B21(k) | MAINTAIN |
| LG22 | B22(k) | MAINTAIN |
| LG31 | B31(k) | MAINTAIN |
| LG32 | B32(k) | MAINTAIN |
| LG41 | B41(k) | MAINTAIN |
| LG42 | B42(k) | MAINTAIN |

BACKLIGHT

| | | |
|---|---|---|
| LG11 | B11(k) | EMIT LIGHT |
| LG12 | B12(k) | EMIT LIGHT |
| LG21 | B21(k) | EMIT LIGHT |
| LG22 | B22(k) | EMIT LIGHT |
| LG31 | B31(k) | EMIT LIGHT |
| LG32 | B32(k) | EMIT LIGHT |
| LG41 | B41(k) | EMIT LIGHT |
| LG42 | B42(k) | EMIT LIGHT |

FIG. 6

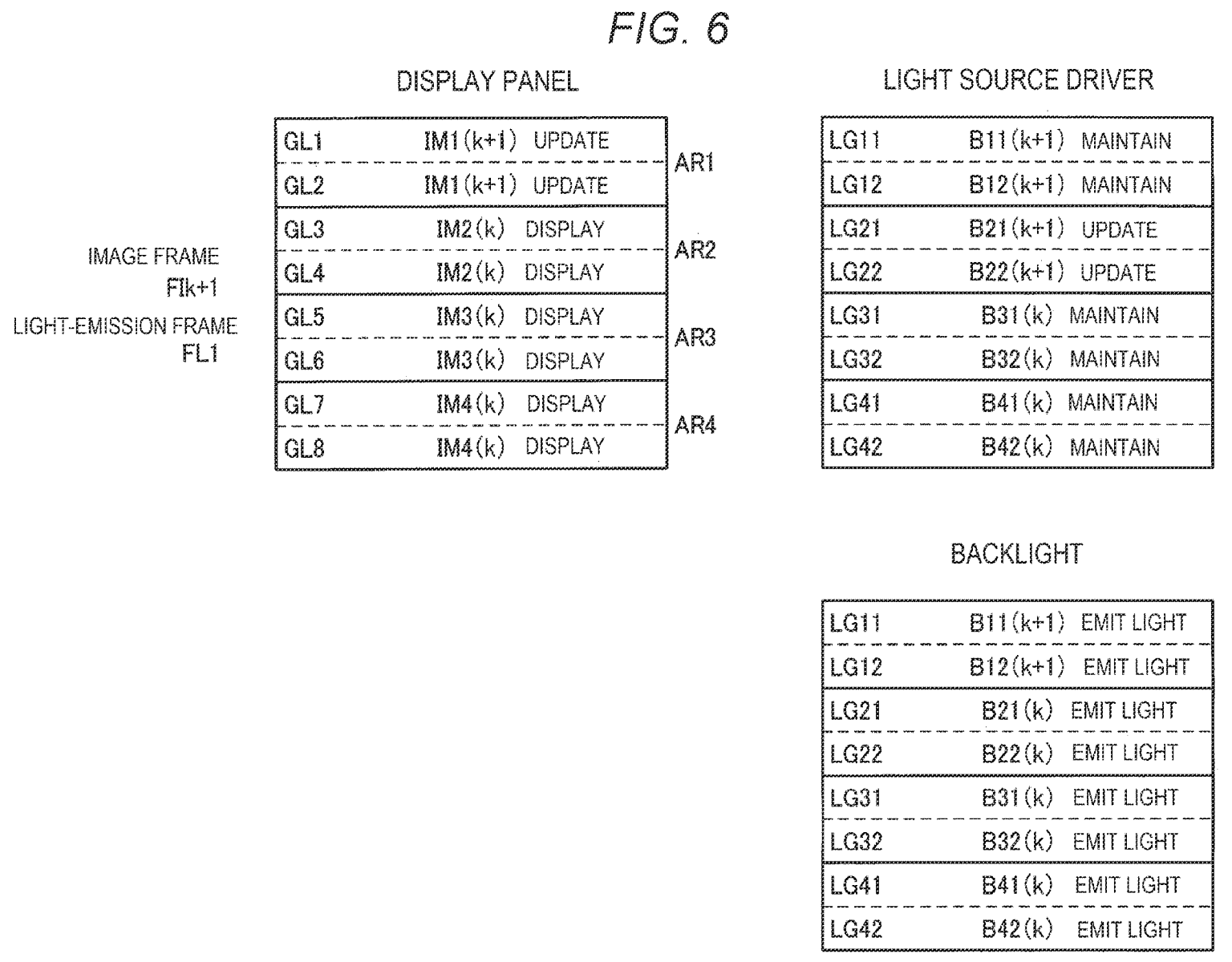

IMAGE FRAME
FIk+1
LIGHT-EMISSION FRAME
FL1

DISPLAY PANEL

| | | | |
|---|---|---|---|
| GL1 | IM1 (k+1) | UPDATE | AR1 |
| GL2 | IM1 (k+1) | UPDATE | |
| GL3 | IM2 (k) | DISPLAY | AR2 |
| GL4 | IM2 (k) | DISPLAY | |
| GL5 | IM3 (k) | DISPLAY | AR3 |
| GL6 | IM3 (k) | DISPLAY | |
| GL7 | IM4 (k) | DISPLAY | AR4 |
| GL8 | IM4 (k) | DISPLAY | |

LIGHT SOURCE DRIVER

| | | |
|---|---|---|
| LG11 | B11 (k+1) | MAINTAIN |
| LG12 | B12 (k+1) | MAINTAIN |
| LG21 | B21 (k+1) | UPDATE |
| LG22 | B22 (k+1) | UPDATE |
| LG31 | B31 (k) | MAINTAIN |
| LG32 | B32 (k) | MAINTAIN |
| LG41 | B41 (k) | MAINTAIN |
| LG42 | B42 (k) | MAINTAIN |

BACKLIGHT

| | | |
|---|---|---|
| LG11 | B11 (k+1) | EMIT LIGHT |
| LG12 | B12 (k+1) | EMIT LIGHT |
| LG21 | B21 (k) | EMIT LIGHT |
| LG22 | B22 (k) | EMIT LIGHT |
| LG31 | B31 (k) | EMIT LIGHT |
| LG32 | B32 (k) | EMIT LIGHT |
| LG41 | B41 (k) | EMIT LIGHT |
| LG42 | B42 (k) | EMIT LIGHT |

FIG. 7

IMAGE FRAME FIk+1
LIGHT-EMISSION FRAME FL2

DISPLAY PANEL

| | | | |
|---|---|---|---|
| GL1 | IM1 (k+1) | DISPLAY | AR1 |
| GL2 | IM1 (k+1) | DISPLAY | AR1 |
| GL3 | IM2 (k+1) | UPDATE | AR2 |
| GL4 | IM2 (k+1) | UPDATE | AR2 |
| GL5 | IM3 (k) | DISPLAY | AR3 |
| GL6 | IM3 (k) | DISPLAY | AR3 |
| GL7 | IM4 (k) | DISPLAY | AR4 |
| GL8 | IM4 (k) | DISPLAY | AR4 |

LIGHT SOURCE DRIVER

| | | |
|---|---|---|
| LG11 | B11 (k+1) | MAINTAIN |
| LG12 | B12 (k+1) | MAINTAIN |
| LG21 | B21 (k+1) | MAINTAIN |
| LG22 | B22 (k+1) | MAINTAIN |
| LG31 | B31 (k+1) | UPDATE |
| LG32 | B32 (k+1) | UPDATE |
| LG41 | B41 (k) | MAINTAIN |
| LG42 | B42 (k) | MAINTAIN |

IMAGE FRAME FIk+1
LIGHT-EMISSION FRAME FL3

| | | | |
|---|---|---|---|
| GL1 | IM1 (k+1) | DISPLAY | AR1 |
| GL2 | IM1 (k+1) | DISPLAY | AR1 |
| GL3 | IM2 (k+1) | DISPLAY | AR2 |
| GL4 | IM2 (k+1) | DISPLAY | AR2 |
| GL5 | IM3 (k+1) | UPDATE | AR3 |
| GL6 | IM3 (k+1) | UPDATE | AR3 |
| GL7 | IM4 (k) | DISPLAY | AR4 |
| GL8 | IM4 (k) | DISPLAY | AR4 |

| | | |
|---|---|---|
| LG11 | B11 (k+1) | MAINTAIN |
| LG12 | B12 (k+1) | MAINTAIN |
| LG21 | B21 (k+1) | MAINTAIN |
| LG22 | B22 (k+1) | MAINTAIN |
| LG31 | B31 (k+1) | MAINTAIN |
| LG32 | B32 (k+1) | MAINTAIN |
| LG41 | B41 (k+1) | UPDATE |
| LG42 | B42 (k+1) | UPDATE |

FIG. 18

IMAGE FRAME FIk
LIGHT-EMISSION FRAME FL4

DISPLAY PANEL

| | | | |
|---|---|---|---|
| GL1 | IM1(k) | DISPLAY | |
| GL2 | IM1(k) | DISPLAY | AR1 |
| GL3 | IM1(k) | DISPLAY | |
| GL4 | IM2(k) | DISPLAY | |
| GL5 | IM2(k) | DISPLAY | AR2 |
| GL6 | IM2(k) | DISPLAY | |
| GL7 | IM3(k) | DISPLAY | |
| GL8 | IM3(k) | DISPLAY | AR3 |
| GL9 | IM3(k) | DISPLAY | |
| GL10 | IM4(k) | UPDATE | |
| GL11 | IM4(k) | UPDATE | AR4 |
| GL12 | IM4(k) | UPDATE | |

LIGHT SOURCE DRIVER

| | | |
|---|---|---|
| LG11 | B11(k+1) | UPDATE |
| LG12 | B12(k+1) | UPDATE |
| LG13 | B13(k+1) | UPDATE |
| LG14 | B14(k) | MAINTAIN |
| LG21 | B21(k) | MAINTAIN |
| LG22 | B22(k) | MAINTAIN |
| LG23 | B23(k) | MAINTAIN |
| LG24 | B24(k) | MAINTAIN |
| LG31 | B31(k) | MAINTAIN |
| LG32 | B32(k) | MAINTAIN |
| LG33 | B33(k) | MAINTAIN |
| LG34 | B34(k) | MAINTAIN |

FIG. 22

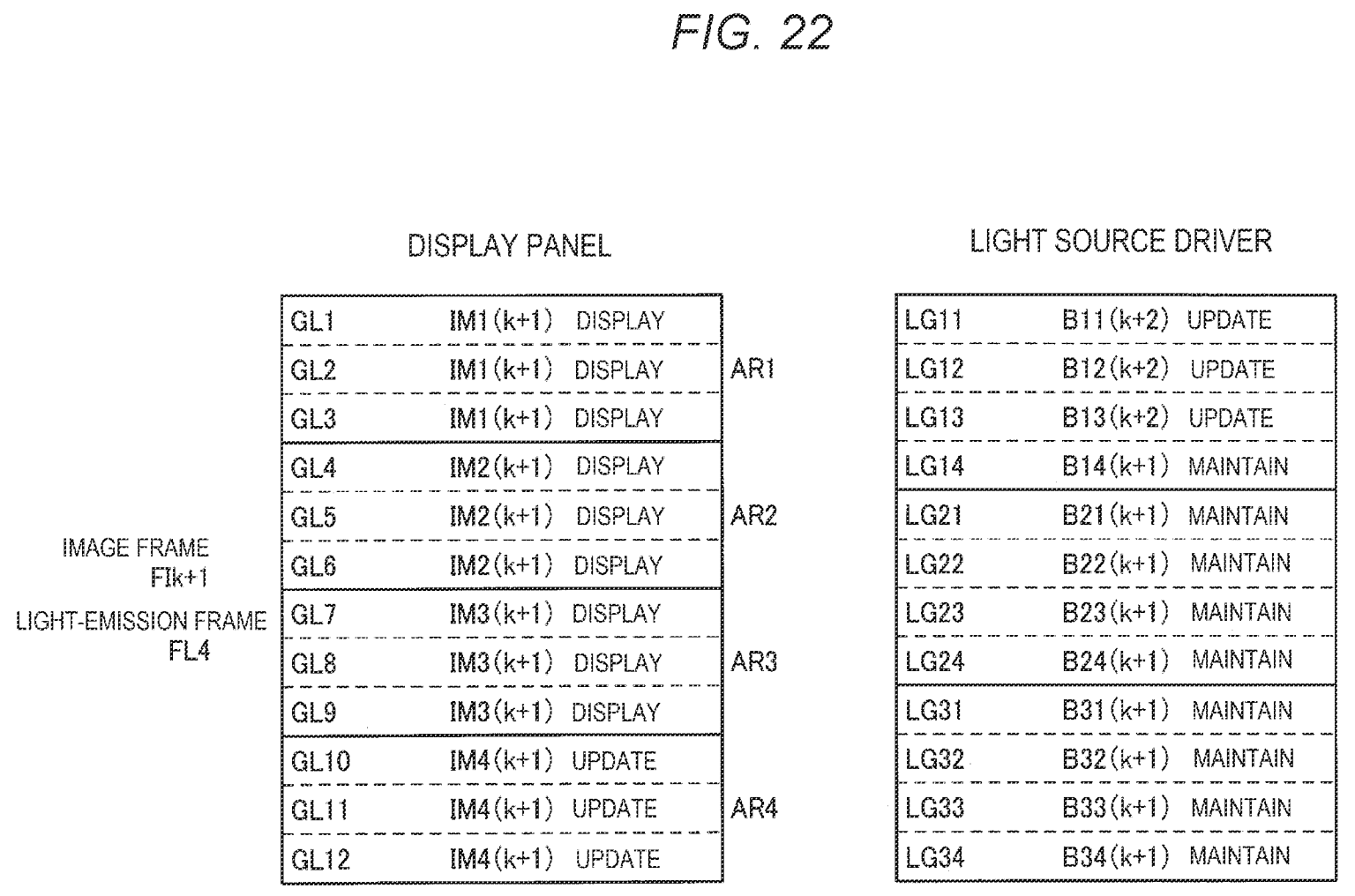

IMAGE FRAME Flk+1

LIGHT-EMISSION FRAME FL4

DISPLAY PANEL

| | | | |
|---|---|---|---|
| GL1 | IM1(k+1) | DISPLAY | AR1 |
| GL2 | IM1(k+1) | DISPLAY | AR1 |
| GL3 | IM1(k+1) | DISPLAY | AR1 |
| GL4 | IM2(k+1) | DISPLAY | AR2 |
| GL5 | IM2(k+1) | DISPLAY | AR2 |
| GL6 | IM2(k+1) | DISPLAY | AR2 |
| GL7 | IM3(k+1) | DISPLAY | AR3 |
| GL8 | IM3(k+1) | DISPLAY | AR3 |
| GL9 | IM3(k+1) | DISPLAY | AR3 |
| GL10 | IM4(k+1) | UPDATE | AR4 |
| GL11 | IM4(k+1) | UPDATE | AR4 |
| GL12 | IM4(k+1) | UPDATE | AR4 |

LIGHT SOURCE DRIVER

| | | |
|---|---|---|
| LG11 | B11(k+2) | UPDATE |
| LG12 | B12(k+2) | UPDATE |
| LG13 | B13(k+2) | UPDATE |
| LG14 | B14(k+1) | MAINTAIN |
| LG21 | B21(k+1) | MAINTAIN |
| LG22 | B22(k+1) | MAINTAIN |
| LG23 | B23(k+1) | MAINTAIN |
| LG24 | B24(k+1) | MAINTAIN |
| LG31 | B31(k+1) | MAINTAIN |
| LG32 | B32(k+1) | MAINTAIN |
| LG33 | B33(k+1) | MAINTAIN |
| LG34 | B34(k+1) | MAINTAIN |

FIG. 25

IMAGE FRAME FIk, LIGHT-EMISSION FRAME FL4

| DISPLAY PANEL | | | | LIGHT SOURCE DRIVER | | | | |
|---|---|---|---|---|---|---|---|---|
| GL1 | IM1(k) DISPLAY | AR1 | | LG11 B11(k+1) | LG21 B21(k+1) | UPDATE |
| GL2 | IM2(k) DISPLAY | AR2 | | LG12 B12(k) | LG22 B22(k) | MAINTAIN |
| GL3 | IM3(k) DISPLAY | AR3 | | LG31 B31(k) | LG41 B41(k) | MAINTAIN |
| GL4 | IM4(k) UPDATE | AR4 | | LG32 B32(k) | LG42 B42(k) | MAINTAIN |

IMAGE FRAME FIk+1, LIGHT-EMISSION FRAME FL1

| DISPLAY PANEL | | | | LIGHT SOURCE DRIVER | | |
|---|---|---|---|---|---|---|
| GL1 | IM1(k+1) UPDATE | AR1 | | LG11 B11(k+1) | LG21 B21(k+1) | MAINTAIN |
| GL2 | IM2(k) DISPLAY | AR2 | | LG12 B12(k+1) | LG22 B22(k+1) | UPDATE |
| GL3 | IM3(k) DISPLAY | AR3 | | LG31 B31(k) | LG41 B41(k) | MAINTAIN |
| GL4 | IM4(k) DISPLAY | AR4 | | LG32 B32(k) | LG42 B42(k) | MAINTAIN |

IMAGE FRAME FIk+1, LIGHT-EMISSION FRAME FL2

| DISPLAY PANEL | | | | LIGHT SOURCE DRIVER | | |
|---|---|---|---|---|---|---|
| GL1 | IM1(k+1) DISPLAY | AR1 | | LG11 B11(k+1) | LG21 B21(k+1) | MAINTAIN |
| GL2 | IM2(k+1) UPDATE | AR2 | | LG12 B12(k+1) | LG22 B22(k+1) | MAINTAIN |
| GL3 | IM3(k) DISPLAY | AR3 | | LG31 B31(k+1) | LG41 B41(k+1) | UPDATE |
| GL4 | IM4(k) DISPLAY | AR4 | | LG32 B32(k) | LG42 B42(k) | MAINTAIN |

DISPLAY SYSTEM AND ELECTRONIC DEVICE

The present application is based on, and claims priority from JP Application Serial Number 2022-167571, filed Oct. 19, 2022, the disclosure of which is hereby incorporated by reference herein in its entirety.

BACKGROUND

1. Technical Field

The present disclosure relates to a display system and an electronic device or the like.

2. Related Art

JP-A-2020-27273 discloses a backlight device that performs local dimming control based on PWM drive. An LED drive circuit of the backlight device includes an LED data holding unit that holds lighting control data, which is data sent from outside in order to control the luminance of an LED. The LED drive circuit drives the LED N times during one frame period and reads out the lighting control data corresponding to the LED from the light control data holding unit N times during one frame period. N is an integer equal to or greater than 2. Thus, the LED is turned on at a high frequency to prevent the occurrence of flickering. Also, since the lighting control data held in the lighting control data holding unit is used repeatedly, repetitive transfer of the same lighting control data from outside can be prevented and the data transfer load is reduced.

There is a problem in that image quality drops if the timing of image update at a display panel and the timing of luminance update at the backlight differ from each other. That is, due to the difference between the timing when the display of image data on the display panel is updated and the timing when the light-emission luminance of the backlight based on the image data is updated, the combination of the image displayed on the display panel and the luminance of the backlight is not appropriate at a certain timing.

SUMMARY

According to an aspect of the present disclosure, a display system includes: a display driver that drives a display panel of a display device including the display panel and a backlight device; a light source driver that drives the backlight device having a plurality of light source elements, based on luminance information that sets a luminance of the plurality of light source elements; and a display controller that controls the display driver and the light source driver. The light source driver causes the plurality of light source elements to emit light, based on a light-emission frame update that is faster than an image frame update on the display panel by the display driver. When the light source driver causes the plurality of light source elements to emit light in an i-th light-emission frame, where i is an integer equal to or greater than 1, the luminance information of the light source element corresponding to a scan area scanned by the display driver in the i-th light-emission frame, of the plurality of light source elements, is updated, based on image data in the scan area at a timing before the i-th light-emission frame.

According to another aspect of the present disclosure, an electronic device includes the foregoing display system and the display device.

BRIEF DESCRIPTION OF THE DRAWINGS

FIG. 5 explains timing control in a first detailed configuration example.

FIG. 6 explains the timing control in the first detailed configuration example.

FIG. 7 explains the timing control in the first detailed configuration example.

FIG. 18 explains timing control in the third detailed configuration example.

FIG. 22 explains the timing control in the third detailed configuration example.

FIG. 25 explains timing control in the fourth detailed configuration example.

DESCRIPTION OF EMBODIMENTS

A preferred embodiment of the present disclosure will now be described in detail. The embodiment described below should not unduly limit the contents described in the claims. Not all the configurations described in the embodiment are necessarily essential component elements.

1. Electronic Device, Display System, and Display Controller

Figure 1:
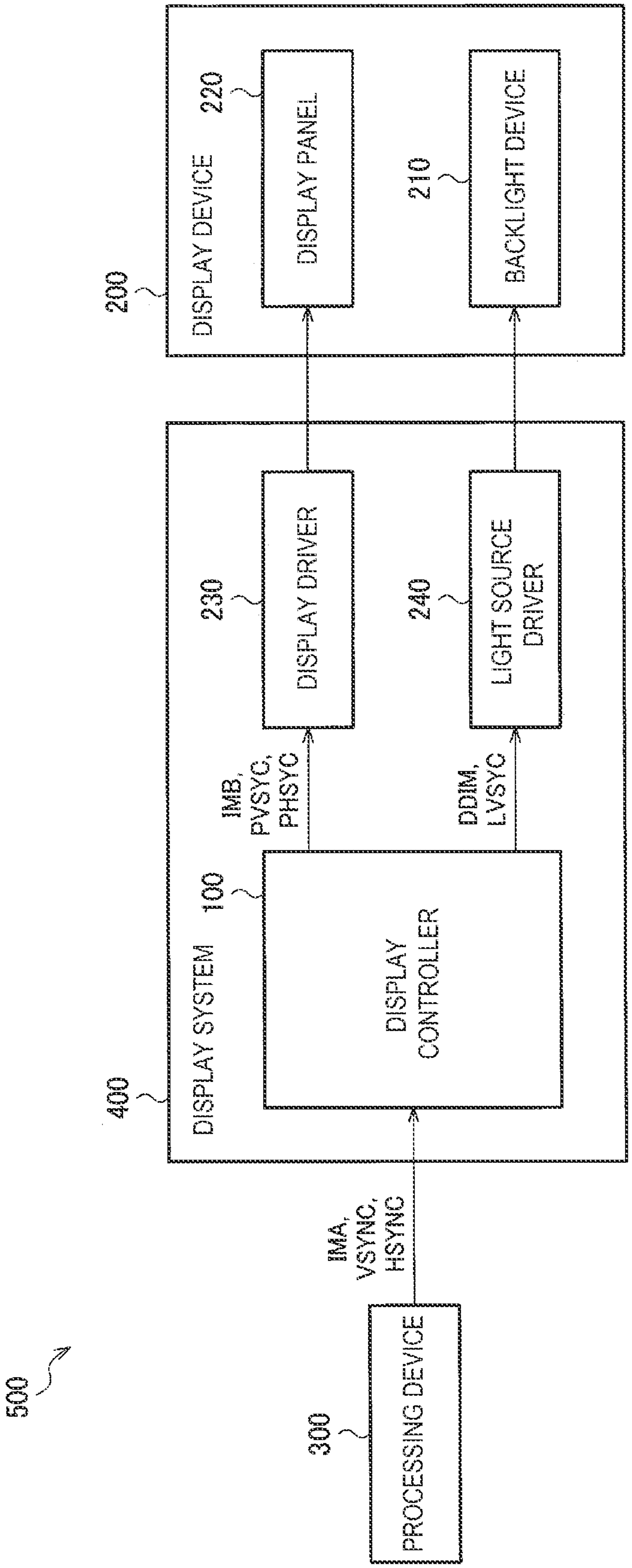
FIG. 1 shows a configuration example of an electronic device including a display system according to an embodiment.

FIG. 1 shows a configuration example of an electronic device including a display system according to this embodiment. An electronic device 500 includes a processing device 300, a display system 400, and a display device 200. In an example, the electronic device 500 is an in-vehicle display device such as a cluster panel or a head-up display, a television device, an information processing device having a display, or the like.

The display system 400 includes a display controller 100, a display driver 230, and a light source driver 240. The display device 200 includes a display panel 220 and a backlight device 210. While the display system 400 and the display device 200 are illustrated as separate component elements in FIG. 1, a part or the entirety of the display system 400 may be provided inside the casing of the display device 200.

An example of the display device 200 is a display used for a cluster panel, a television device, or an information processing device or the like. Alternatively, the display device 200 may be a head-mounted display including a projection device for the eyes, or a head-up display including a projection device for a screen, or the like. When the display device 200 is a head-up display, the display device 200 further includes an optical system for projecting light emitted from the backlight device 210 and transmitted through the display panel 220, onto the screen.

As viewed in a plan view of the backlight device 210, light source elements are arranged two-dimensionally in the backlight device 210. The light source element is a light-emitting element that emits light when supplied with electric power. The light source element is, for example, an inorganic light-emitting diode or an organic light-emitting diode. This embodiment is applicable to both local dimming control and global dimming control. In local dimming control, the light-emission luminances of the two-dimensionally arranged light source elements are controlled independently of each other. Alternatively, the backlight may be divided into a plurality of areas, each area including a plurality of light source elements, as viewed in a plan view, and the light source elements included in each area may be controlled to have the same light-emission luminance, whereas the light-emission luminances of the areas may be controlled independently of each other. In global dimming control, all the two-dimensionally arranged light source elements are controlled to have the same light-emission luminance.

An example of the two-dimensional arrangement of the light source elements is a matrix arrangement where a light source element is arranged at all the points of intersection of a plurality of rows and a plurality of columns. However, the two-dimensional arrangement is not limited to the matrix arrangement. For example, the two-dimensional arrangement may be an arrangement called rhomboidal arrangement or staggered arrangement. In this arrangement, a light source element is arranged at a point of intersection of one of an odd-number row and an even-number row, and an odd-number column, and a point of intersection of the other of the odd-number row and the even-number row, and an even-number column. No light source element is arranged at the other points of intersection.

The light source driver 240 receives luminance information DDIM and a second vertical synchronization signal LVSYC for driving the backlight from the display controller 100 and drives each light source element of the backlight device 210, based on the luminance information DDIM and the second vertical synchronization signal LVSYC. The luminance information DDIM is information representing the light-emission luminance of each LED and is also referred to as luminance data or dimming data. In global dimming control, the luminance information DDIM may be information representing the light-emission luminance of the entirety of the backlight. The light source driver 240 is, for example, an integrated circuit device where a plurality of circuit elements are integrated at a semiconductor substrate. The light source driver may be formed of a plurality of drivers and the drivers may be separate integrated circuit devices from each other.

The display panel 220 is an electro-optical panel that transmits the light from the backlight device 210 and that displays an image by having the transmittance thereof controlled. For example, the display panel 220 is a liquid crystal panel.

The display driver 230 receives image data IMB and a timing control signal from the display controller 100 and drives the display panel, based on the image data IMB and the timing control signal, and thus causes the display panel 220 to display an image. The timing control signal includes a first vertical synchronization signal PVSYC for driving the panel and a horizontal synchronization signal PHSYC for driving the panel. The display driver 230 may be formed of an integrated circuit device that is separate from the display controller 100, or may be formed of an integrated circuit device unified with the display controller 100.

The processing device 300 transmits a vertical synchronization signal VSYNC, a horizontal synchronization signal HSYNC, and image data IMA transmitted synchronously with these synchronization signals, to the display controller 100. The processing device 300 is, for example, a processor such as a CPU, a micro-computer, a DSP, an ASIC, or an FPGA.

The display controller 100 receives the vertical synchronization signal VSYNC, the horizontal synchronization signal HSYNC, and the image data IMA, and performs image processing and dimming processing, based on these signals and data. The dimming processing may be either local dimming control or global dimming control. The display controller 100 outputs the first vertical synchronization signal PVSYC, the horizontal synchronization signal PHSYC, and the image data IMB, which is the result of the image processing, to the display driver 230, and outputs the second vertical synchronization signal LVSYC and the luminance information DDIM, which is the result of the dimming processing, to the light source driver 240.

The display controller 100 performs color correction on the image data, based on the luminance information DDIM, which is the result of the dimming processing. At this point, the display controller 100 controls the timing of updating the luminance information of each light source element of the backlight device 210, according to the timing when a scan line of the image is scanned. That is, the update of the luminance of the backlight is controlled in such a way as to reduce the time lag between the image displayed by having the scan line scanned and the light-emission luminance of the backlight dimmed based on the image in the scanned area.

2. Display Controller

Figure 2:
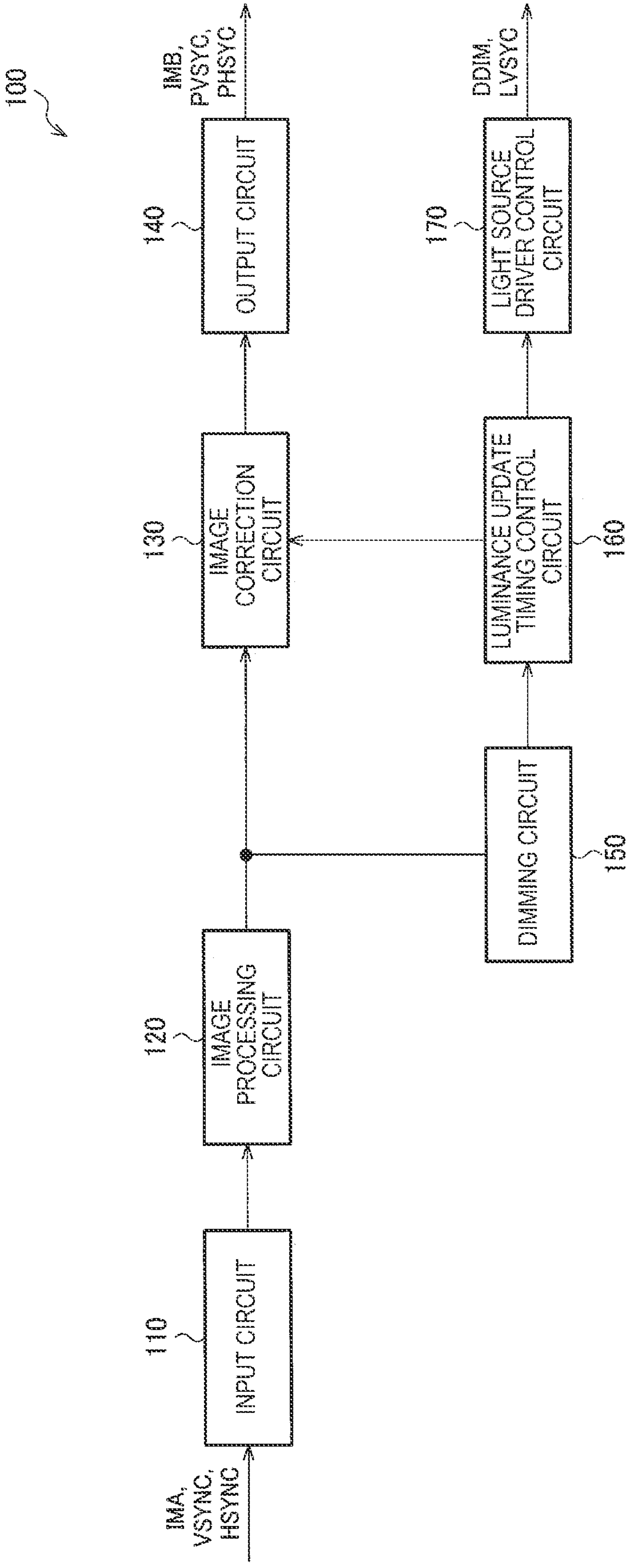
FIG. 2 shows a detailed configuration example of a display controller.

FIG. 2 shows a detailed configuration example of the display controller. The display controller 100 includes an input circuit 110, an image processing circuit 120, an image correction circuit 130, an output circuit 140, a dimming circuit 150, a luminance update timing control circuit 160, and a light source driver control circuit 170. In the description below, local dimming control is employed as an example. However, the method for controlling the timing of light emission in this embodiment is also applicable to global dimming control, as described above.

The input circuit 110 receives the image data IMA and the timing control signal from the processing device 300. The timing control signal includes the vertical synchronization signal VSYNC and the horizontal synchronization signal HSYNC. The input circuit 110 may be an interface circuit using various image interface systems such as LVDS, parallel RGB system, or Display Port.

The image processing circuit 120 performs, for example, grayscale correction, white balance correction, enlargement and reduction, keystone correction, or distortion correction or the like, on the image data IMA. The distortion correction reduces an image distortion caused by the optical system projecting the image. For example, when the electronic device 500 is a head-up display, the image processing circuit 120 performs the distortion correction.

The dimming circuit 150 performs dimming processing of local dimming, based on the image-processed image data from the image processing circuit 120. That is, the dimming circuit 150 analyzes the luminance of the image data, decides the light-emission luminance of each light-emitting element, based on the result of the analysis, and outputs luminance information representing the light-emission luminance of each light-emitting element. For example, the dimming circuit 150 divides the image into a plurality of areas. Each area corresponds to each light-emitting element of the backlight device 210. The dimming circuit 150 decides a maximum luminance of pixel data belonging to the area, decides a minimum light-emission luminance of the light-emitting element within such a range that the maximum luminance can be displayed by the display device 200, and employs this light-emission luminance as the light-emission luminance of the light-emitting element.

The luminance update timing control circuit 160 controls the timing of displaying an image and the timing of updating the luminance of the backlight. The luminance update timing control circuit 160 controls these timings, for example, based on the vertical synchronization signal VSYNC and the horizontal synchronization signal HSYNC. The luminance update timing control circuit 160 outputs the luminance information from the dimming circuit 150 to the image correction circuit 130 and the light source driver control circuit 170 and gives a timing instruction to these circuits.

The light source driver control circuit 170 outputs the luminance information DDIM and the second vertical synchronization signal LVSYC for driving the backlight to the light source driver 240, based on the timing instruction from the luminance update timing control circuit 160. The light source driver 240 includes a storage circuit that holds the luminance information. The storage circuit is, for example, a register or a memory, or the like. The light source driver control circuit 170 updates the luminance information held by the storage circuit of the light source driver 240, at the timing indicated by the timing instruction. Alternatively, the light source driver control circuit 170 transmits a timing instruction and the luminance information to the light source driver 240, and the light source driver 240 updates the luminance information held by the storage circuit, at the timing indicated by the timing instruction. The light source driver 240 causes the light source element to emit light, based on the updated luminance information, at the synchronization timing of the first second vertical synchronization signal LVSYC after the luminance information held by the storage circuit is updated. That is, the timing when the luminance of the light emitted by the light source element changes is the synchronization timing of the first second vertical synchronization signal LVSYC after the luminance information is updated.

The image correction circuit 130 performs color correction on the image data, based on the image-processed image data and the luminance information. That is, the image correction circuit 130 finds a lighting luminance of light reaching each pixel in the display panel 220 from the backlight device 210, based on the light-emission luminance of each light-emitting element represented by the luminance information. The image correction circuit 130 multiplies pixel data of each pixel by the reciprocal of the lighting luminance of the light reaching the pixel and employs the result as new pixel data of the pixel. The image correction circuit 130 outputs the timing control signal and the color-corrected image data synchronized with the timing control signal, according to the timing instruction from the luminance update timing control circuit 160.

The output circuit 140 outputs the first vertical synchronization signal PVSYC and the horizontal synchronization signal PHSYC for driving the panel and the image data IMB synchronized with these synchronization signals to the display driver 230, based on the timing control signal and the image data from the image correction circuit 130.

The image processing circuit 120, the image correction circuit 130, the dimming circuit 150, and the luminance update timing control circuit 160 are logic circuits that process a digital signal. Each of these circuit may be formed of a separate logic circuit. A part or all of these circuits may be unified and formed of one logic circuit. Alternatively, a processor such as a DSP may execute a command set or a program describing the functions of the image processing circuit 120, the image correction circuit 130, the dimming circuit 150, and the luminance update timing control circuit 160, and thus may implement the functions of these circuits.

3. First Detailed Configuration Example and Example of Timing Control Therefor

Figure 3:
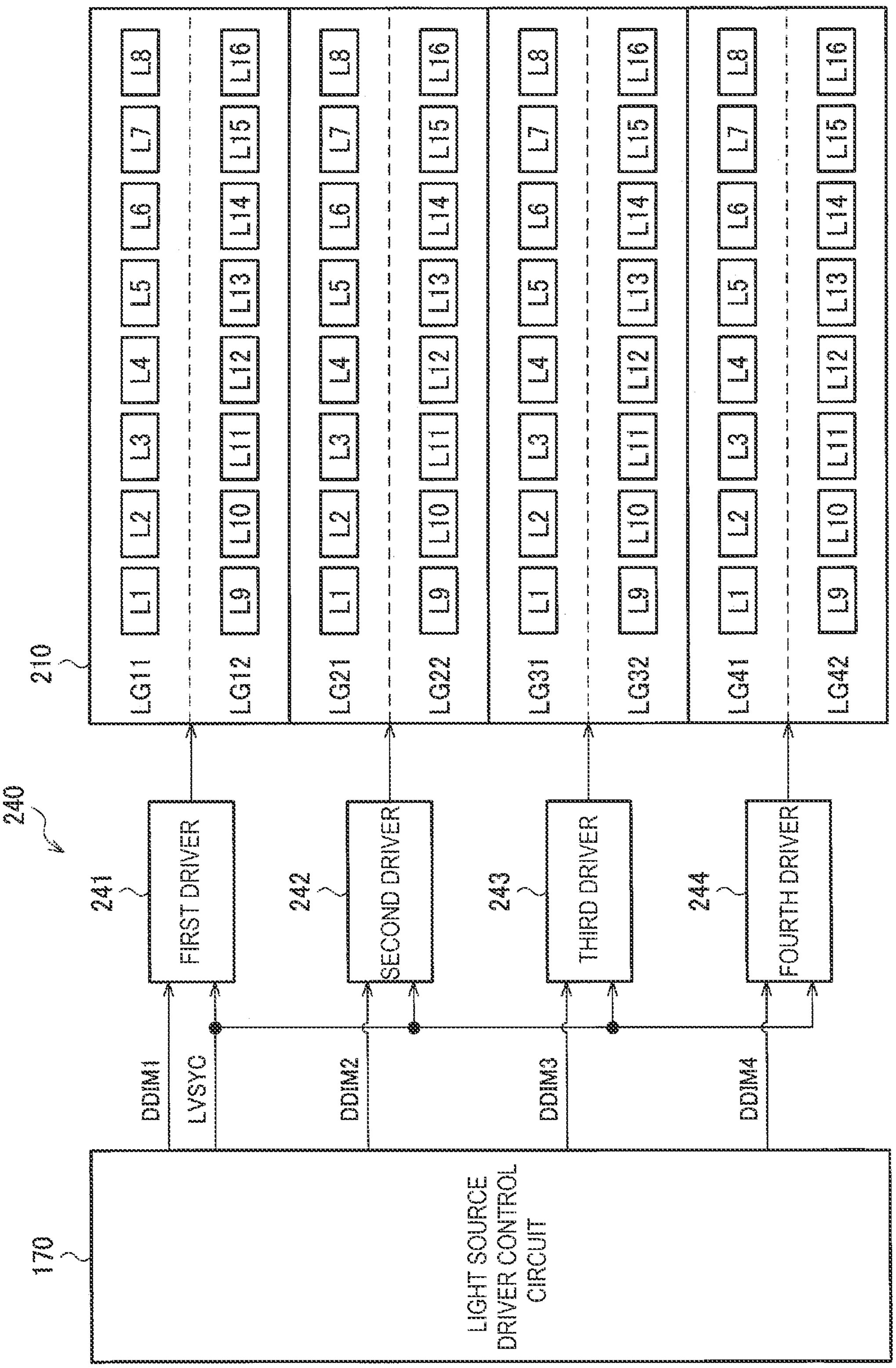
FIG. 3 shows a first detailed configuration example of a light source driver control circuit, a light source driver, and a backlight device.

FIG. 3 shows a first detailed configuration example of the light source driver control circuit, the light source driver, and the backlight device. In the description below, an example where the light source elements of the backlight device 210 are arranged in a matrix is described. However, the arrangement of the light source elements is not limited to this example. For example, a staggered arrangement is considered to be an arrangement where a part of the light source elements in the matrix arrangement is absent. Therefore, timing control similar to the timing control in the case of the matrix arrangement may be performed in the staggered arrangement as well.

The backlight device 210 includes light source elements arranged in a matrix of eight rows by eight columns. In FIG. 3, the display panel 220 is omitted. However, in the backlight device 210 in FIG. 3, an arrangement of light source elements as viewed in a plan view of the display panel 220 is shown.

The light source driver 240 includes first to fourth drivers 241 to 244. One driver drives 16 light source elements, which are referred to as light source elements L1 to L16. In the first detailed configuration example, each driver drives light source elements in an area horizontally divided into two rows in the backlight device 210. That is, the first driver 241 drives a light source element group LG11 formed of the light source elements L1 to L8 in the first row, and a light source element group LG12 formed of the light source elements L9 to L16 in the second row. The second driver 242 drives a light source element group LG21 formed of the light source elements L1 to L8 in the third row, and a light source element group LG22 formed of the light source elements L9 to L16 in the fourth row. The third driver 243 drives a light source element group LG31 formed of the light source elements L1 to L8 in the fifth row, and a light source element group LG32 formed of the light source elements L9 to L16 in the sixth row. The fourth driver 244 drives a light source element group LG41 formed of the light source elements L1 to L8 in the seventh row, and a light source element group LG42 formed of the light source elements L9 to L16 in the eighth row.

The light source driver control circuit 170 outputs the second vertical synchronization signal LVSYC to the first to fourth drivers 241 to 244. The light source driver control circuit 170 also outputs luminance information DDIM1 representing the light-emission luminance of each light source element in the light source element groups LG11 and LG12, to the first driver 241. The light source driver control circuit 170 outputs luminance information DDIM2 representing the light-emission luminance of each light source element in the light source element groups LG21 and LG22, to the second driver 242. The light source driver control circuit 170 outputs luminance information DDIM3 representing the light-emission luminance of each light source element in the light source element groups LG31 and LG32, to the third driver 243. The light source driver control circuit 170 outputs luminance information DDIM4 representing the light-emission luminance of each light source element in the light source element groups LG41 and LG42, to the fourth driver 244. Each driver drives each light source element with a PWM signal based on the received luminance information and thus causes each light source element to emit light with the luminance represented by the luminance information.

Figure 4:
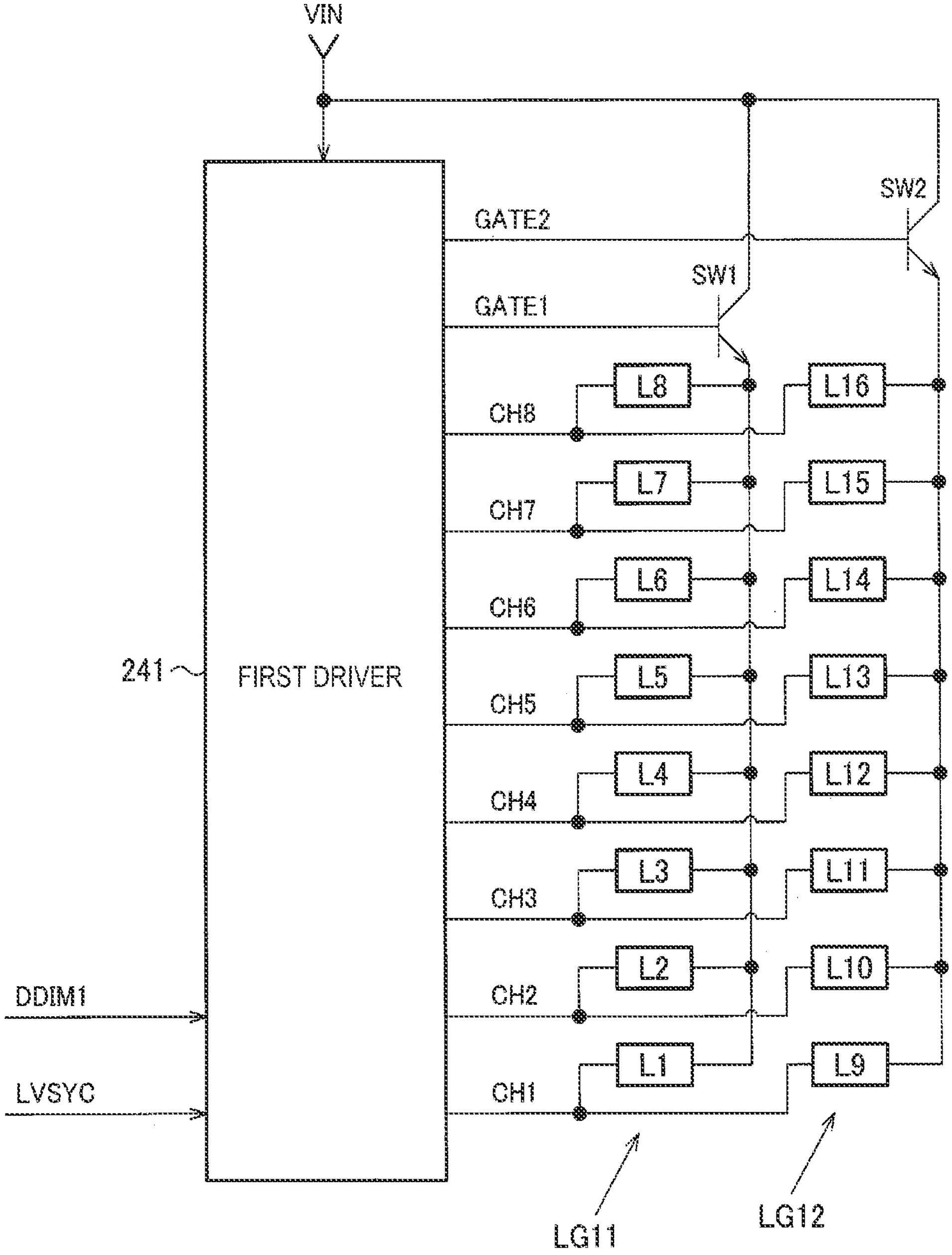
FIG. 4 shows an example of a coupling configuration of the light source driver and light source elements.

FIG. 4 shows an example of the coupling configuration of the light source driver and the light source elements. An example of the coupling configuration of the first driver 241 is described now. However, a similar configuration is applied to the second to fourth drivers 242 to 244.

The first driver 241 outputs gate signals GATE1 and GATE2 for selecting a row of the two-dimensionally arranged light source elements, and channel signals CH1 to CH8 for selecting a column. The gate signal GATE1 is inputted to the base of a bipolar transistor SW1. The collector of the bipolar transistor SW1 is coupled to a node of a power-supply voltage VIN. The collector is coupled to one ends of the light source elements L1 to L8. The gate signal GATE2 is coupled to the base of a bipolar transistor SW2. The collector of the bipolar transistor SW2 is coupled to the node of the power-supply voltage VIN. The collector is coupled to one ends of the light source elements L9 to L16. The bipolar transistors SW1 and SW2 are provided, for example, in the backlight device 210.

When the gate signal GATE1 is active, the bipolar transistor SW1 is on. When the gate signal GATE2 is active, the bipolar transistor SW2 is on. When the channel signal CH1 is active, the other ends of the light source elements L1 and L9 are coupled to a ground node. Similarly, when the channel signals CH2 to CH8 are active, the other ends of the light source elements L2 to L8 and L10 to L16 are coupled to a ground node. For example, when the gate signal GATE1 and the channel signal CH1 are active, the light source element L1 emits light. In the waveform examples from FIG. 9 onward, it is assumed that the gate signal is low-active and that the channel signal is high-active.

FIGS. 5 to 8 explain timing control in the first detailed configuration example. A frame prescribed by the first vertical synchronization signal PVSYC for driving the panel is referred to as an image frame. A frame prescribed by the horizontal synchronization signal PHSYC for driving the panel is referred to as a light-emission frame.

In the description below, for example, one image frame is divided into four, which are defined as light-emission frames FL1 to FL4. The rate of a light-emission frame is four times the rate of an image frame. The rate of a light-emission frame may be twice the rate of an image frame or higher. In this example, the number of light-emission frames in one image frame is four, which is the same as the number of light source drivers. However, the number of light-emission frames may be not the same as the number of light source drivers. An example where the number of light-emission frames differs from the number of light source drivers will be described later, for example, in a second detailed configuration example.

Also, in the description below, an example where the light source driver control circuit 170 updates the luminance information held by the storage circuit of the light source driver 240, at a timing designated by the luminance update timing control circuit 160, is described. However, the light source driver 240 may update the luminance information held by the storage circuit, at a designated timing, as described above.

FIG. 5 shows a control example for the light-emission frame FL4 of an image frame FIk. Here, k is an integer equal to or greater than 0. However, k=0 represents an initial state before the start of display, and k=1 corresponds to the first frame after the start of display. The initial state will be described later with reference to FIG. 9.

As shown at the top left of the illustration, an area in the display panel 220 scanned by the display driver 230 in the light-emission frame FL1 is defined as a scan area AR1. Similarly, areas in the display panel 220 scanned by the display driver 230 in the light-emission frames FL2 to FL4 are defined as scan areas AR2 to AR4. In an example, the pixel array in the display panel 220 is formed of eight scan lines GL1 to GL8. In this case, each scan area is formed of two scan lines. Image data displayed in the scan area AR1, of the image data IMB, is defined as IM1($k$). Similarly, image data displayed in the scan areas AR2 to AR4, of the image data IMB, are defined as IM2($k$) to IM4($k$).

The display driver 230 scans the scan lines GL7 and GL8 in the light-emission frame FL4 of the image frame FIk and thus updates the display in the scan area AR4 with the image data IM4($k$). In the scan areas AR1, AR2, AR3, the image data IM1($k$), IM2($k$), IM3($k$) are already displayed and these image data are maintained.

As shown at the top left and the bottom right of the illustration, the light source element groups LG11 and LG12 of the backlight device 210 are arranged behind the scan area AR1 as viewed in a plan view of the display panel 220, and illuminate the scan area AR1. Similarly, the light source element groups LG21 and LG22 are arranged behind the scan area AR2 and illuminate the scan area AR2. The light source element groups LG31 and LG32 are arranged behind the scan area AR3 and illuminate the scan area AR3. The light source element groups LG41 and LG42 are arranged behind the scan area AR4 and illuminate the scan area AR4.

As shown at the top right of the illustration, in the light-emission frame FL4 of the image frame FIk, the light source driver control circuit 170 updates the luminance information of the light source element group LG11 held by the light source driver 240 with B11(*k*+1) and updates the luminance information of the light source element group LG12 with B12(*k*+1). The luminance information B11(*k*+1) and B12(*k*+1) are dimmed, based on image data IM1(*k*+1) displayed in the scan area AR1 in the next light-emission frame. The luminance information of the light source element groups LG21, LG22, LG31, LG32, LG41, LG42 held by the light source driver 240 is luminance information B21(*k*), B22(*k*), B31(*k*), B32(*k*), B41(*k*), B42(*k*). The light source driver control circuit 170 maintains this luminance information.

That "the light source driver control circuit 170 maintains the luminance information" means that, for example, when the light source element group LG21 is taken as an example, the light source driver control circuit 170 updates the luminance information B21(*k*) held by the light source driver 240 with the same luminance information B21(*k*). Alternatively, the light source driver control circuit 170 may not transmit the luminance information of the light source element group LG21 and thus may maintain the luminance information B21(*k*) held by the light source driver 240.

As shown at the bottom right of the illustration, in the light-emission frame FL4 of the image frame FIk, the light source driver 240 causes the backlight device 210 to emit light, using the luminance information updated in the immediately previous light-emission frame FL3. That is, the light source driver 240 causes the light source element group LG11 to emit light with the luminance represented by the luminance information B11(*k*). Similarly, the light source driver 240 causes the light source element group LG12, LG21, LG22, LG31, LG32, LG41, LG42 to emit light with the luminance represented by the luminance information B12(*k*), B21(*k*), B22(*k*), B31(*k*), B32(*k*), B41(*k*), B42(*k*).

FIG. 6 shows a control example for the light-emission frame FL1 of an image frame FIk+1.

As shown at the top left of the illustration, the display driver 230 scans the scan lines GL1 and GL2 and thus updates the display in the scan area AR1 with the image data IM1(*k*+1). In the scan areas AR2, AR3, AR4, the image data IM2(*k*), IM3(*k*), IM4(*k*) are already displayed and these image data are maintained.

As shown at the top right of the illustration, the light source driver control circuit 170 updates the luminance information of the light source element group LG21 held by the light source driver 240 with B21(*k*+1) and updates the luminance information of the light source element group LG22 with B22(*k*+1). The luminance information B21(*k*+1) and B22(*k*+1) are dimmed, based on image data IM2(*k*+1) displayed in the scan area AR2 in the next light-emission frame. The luminance information of the light source element groups LG11, LG12, LG31, LG32, LG41, LG42 held by the light source driver 240 is the luminance information B11(*k*+1), B12(*k*+1), B31(*k*), B32(*k*), B41(*k*), B42(*k*). The light source driver control circuit 170 maintains this luminance information.

As shown at the bottom right of the illustration, the light source driver 240 causes the backlight device 210 to emit light, using the luminance information updated in the light-emission frame FL4 of the image frame FIk, which is the immediately previous light-emission frame. That is, the light source driver 240 causes the light source element group LG11 to emit light with the luminance represented by the luminance information B11(*k*+1). Similarly, the light source driver 240 causes the light source element groups LG12, LG21, LG22, LG31, LG32, LG41, LG42 to emit light with the luminance represented by the luminance information B12(*k*+1), B21(*k*), B22(*k*), B31(*k*), B32(*k*), B41(*k*), B42(*k*).

The top of FIG. 7 shows a control example for the light-emission frame FL2 of the image frame FIk+1. In the description below, an illustration of the light-emission state of the backlight device 210 is omitted. However, as described with reference to FIGS. 5 and 6, the light source driver 240 causes the backlight device 210 to emit light, using the luminance information updated in the immediately previous light-emission frame.

As shown at the top left of the illustration, the display driver 230 scans the scan lines GL3 and GL4 and thus updates the display in the scan area AR2 with the image data IM2(*k*+1). In the scan areas AR1, AR3, AR4, the image data IM1(*k*+1), IM3(*k*), IM4(*k*) are already displayed and these image data are maintained.

As shown at the top right of the illustration, the light source driver control circuit 170 updates the luminance information of the light source element group LG31 held by the light source driver 240 with B31(*k*+1) and updates the luminance information of the light source element group LG32 with B32(*k*+1). The luminance information B31(*k*+1) and B32(*k*+1) are dimmed, based on image data IM3(*k*+1) displayed in the scan area AR3 in the next light-emission frame. The luminance information of the light source element groups LG11, LG12, LG21, LG22, LG41, LG42 held by the light source driver 240 is the luminance information B11(*k*+1), B12(*k*+1), B21(*k*+1), B22(*k*+1), B41(*k*), B42(*k*). The light source driver control circuit 170 maintains this luminance information.

The bottom of FIG. 7 shows a control example for the light-emission frame FL3 of the image frame FIk+1.

As shown at the bottom left of the illustration, the display driver 230 scans the scan lines GL5 and GL6 and thus updates the display in the scan area AR3 with the image data IM3(*k*+1). In the scan areas AR1, AR2, AR4, the image data IM1(*k*+1), IM2(*k*+1), IM4(*k*) are already displayed and these image data are maintained.

As shown at the bottom right of the illustration, the light source driver control circuit 170 updates the luminance information of the light source element group LG41 held by the light source driver 240 with B41(*k*+1) and updates the luminance information of the light source element group LG42 with B42(*k*+1). The luminance information B41(*k*+1) and B42(*k*+1) are dimmed, based on image data IM4(*k*+1) displayed in the scan area AR4 in the next light-emission frame. The luminance information of the light source element groups LG11, LG12, LG21, LG22, LG31, LG32 held by the light source driver 240 is the luminance information B11(*k*+1), B12(*k*+1), B21(*k*+1), B22(*k*+1), B31(*k*+1), B32 (*k*+2). The light source driver control circuit 170 maintains this luminance information.

Figure 8:
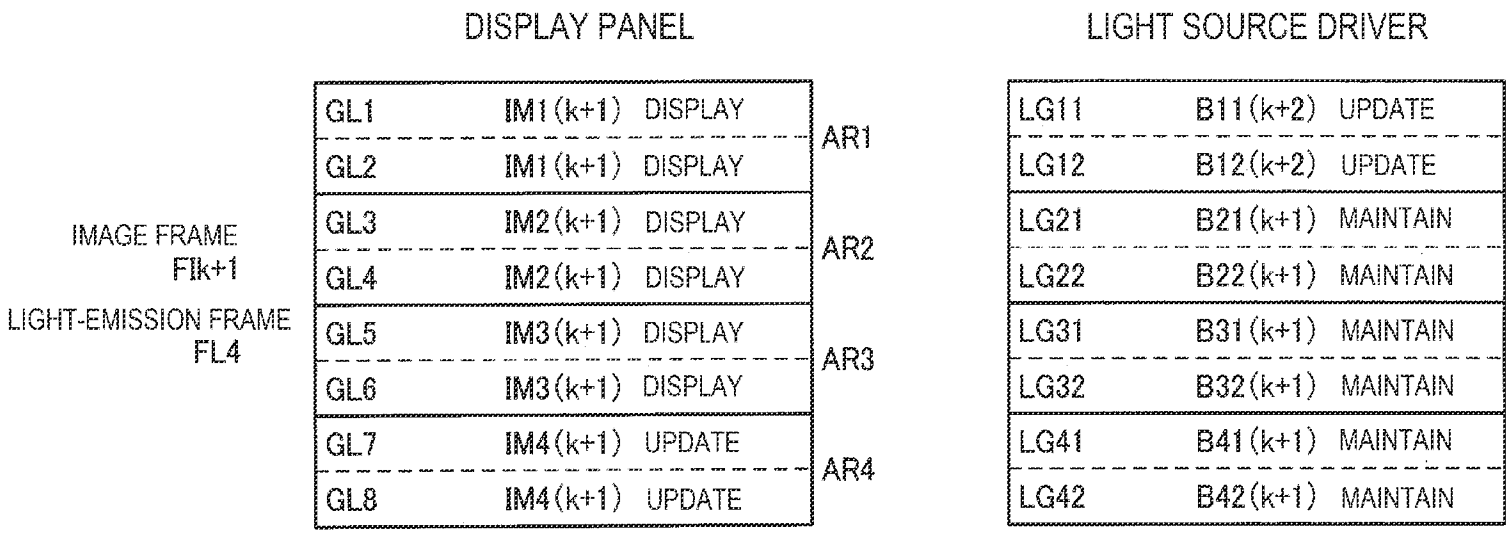
FIG. 8 explains the timing control in the first detailed configuration example.

FIG. 8 shows a control example for the light-emission frame FL4 of the image frame FIk+1.

As shown at the left of the illustration, the display driver 230 scans the scan lines GL7 and GL8 and thus updates the display in the scan area AR4 with the image data IM4(*k*+1).

In the scan areas AR1, AR2, AR3, the image data IM1(k+1), IM2(k+1), IM3(k+1) are already displayed and these image data are maintained.

As shown at the right of the illustration, the light source driver control circuit 170 updates the luminance information of the light source element group LG11 held by the light source driver 240 with B11(k+2) and updates the luminance information of the light source element group LG12 with B12(k+2). The luminance information B11(k+2) and B12 (k+2) are dimmed, based on image data IM1(k+2) displayed in the scan area AR1 in the next light-emission frame. The luminance information of the light source element groups LG21, LG22, LG31, LG32, LG41, LG42 held by the light source driver 240 is the luminance information B21(k+1), B22(k+1), B31(k+1), B32(k+1), B41(k+1), B42(k+1). The light source driver control circuit 170 maintains this luminance information.

Figure 9:
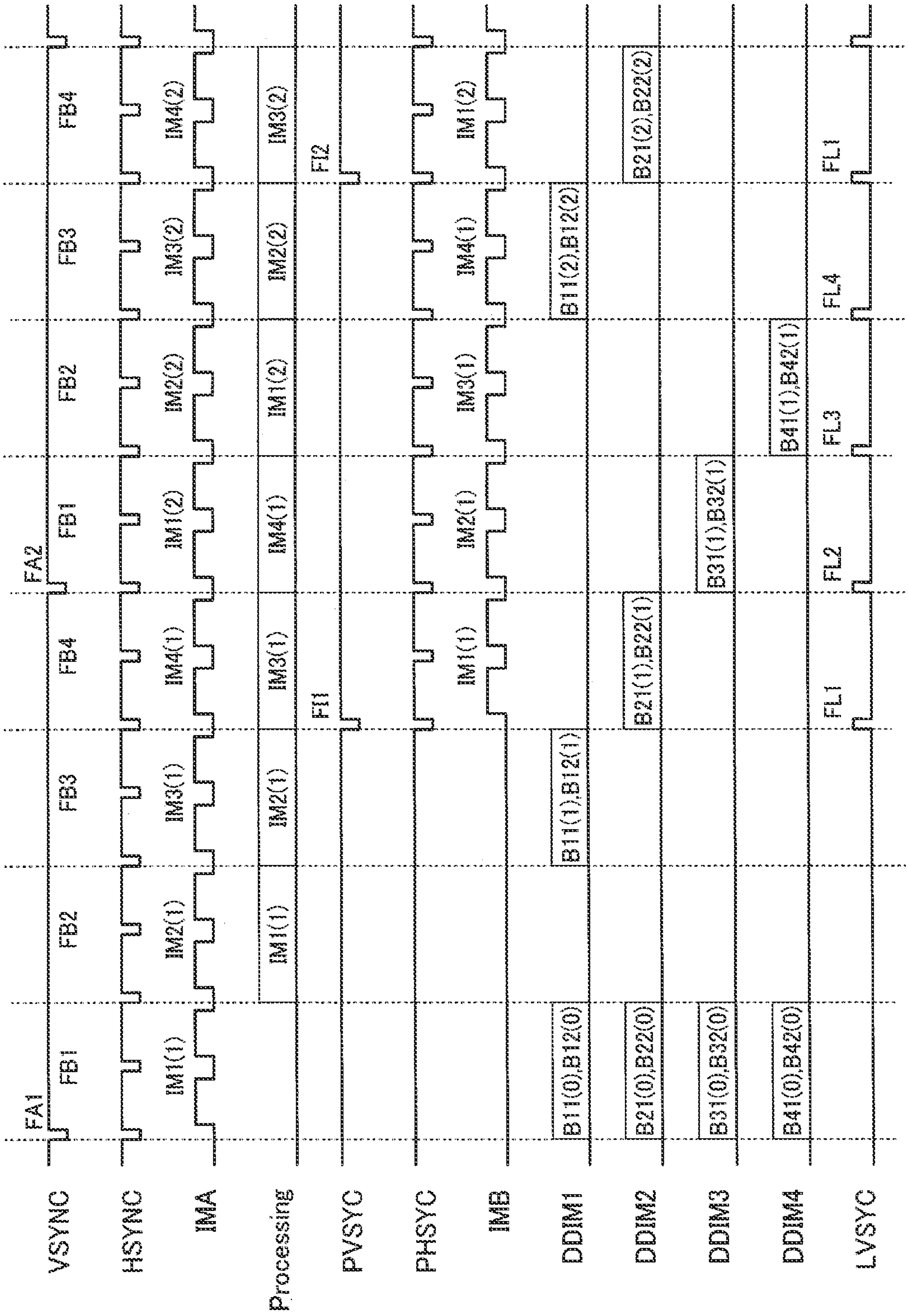
FIG. 9 shows a waveform example illustrating the timing control in the first detailed configuration example.
Figure 10:
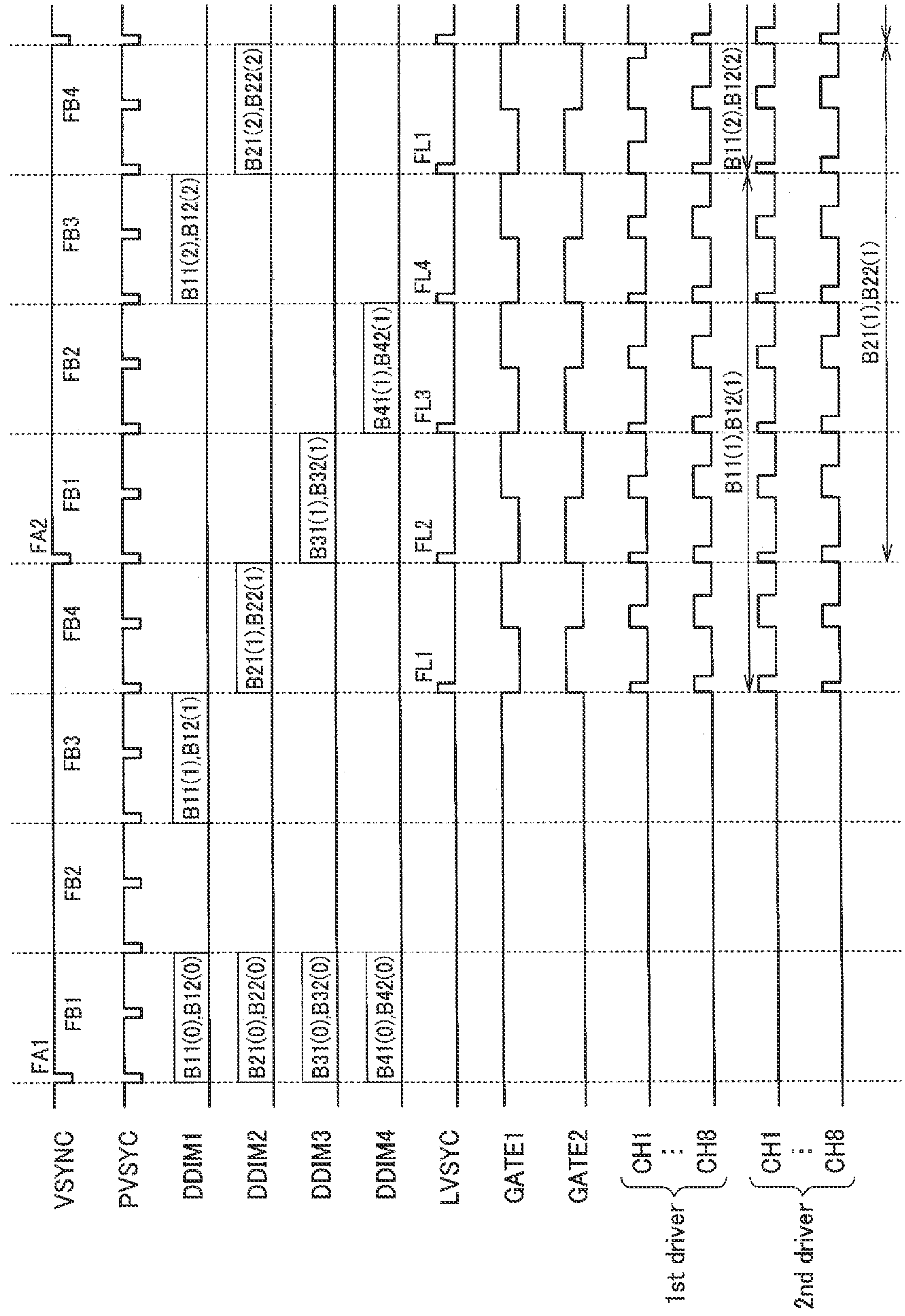
FIG. 10 shows a waveform example illustrating the timing control in the first detailed configuration example.

FIGS. 9 and 10 show waveform examples illustrating the timing control in the first detailed configuration example.

The processing device 300 transmits the vertical synchronization signal VSYNC, the horizontal synchronization signal HSYNC, and the image data IMA to the display controller 100. A frame prescribed by the vertical synchronization signal VSYNC is defined as FAk. Four division frames formed by dividing the frame FAk are defined as FB1 to FB4. Each division frame is equivalent to two periods of the horizontal synchronization signal HSYNC.

In the division frame FB1 of a frame FA1, the processing device 300 transmits image data IM1(1) corresponding to the scan area AR1. Similarly, in the division frames FB2 to FB4 of the frame FA1, the processing device 300 transmits image data IM2(1) to IM4(1) corresponding to the scan areas AR2 to AR4. In the division frames FB1 to FB4 of a frame FA2, the processing device 300 transmits image data IM1(2) to IM4(2) corresponding to the scan areas AR1 to AR4.

From the division frame FB4 of the frame FA1 onward, the display driver 230 drives the display panel 220, based on the first vertical synchronization signal PVSYC and the horizontal synchronization signal PHSYC for driving the panel received from the output circuit 140. Here, an example where the first pulse of the first vertical synchronization signal PVSYC is outputted at the timing when the division frame FB4 of the frame FA1 is started is described. In this case, the image frame FIk corresponds to the division frame FB4 of the frame FAk and the division frames FB1 to FB3 of a frame FAk+1.

FIGS. 9 and 10 illustrate the first vertical synchronization signal PVSYC and the horizontal synchronization signal PHSYC corresponding to the timing when the display driver 230 drives the display panel 220. The output circuit 140 transmits these signals and the image data IMB to the display driver 230 before the illustrated timing according to a processing delay in the display driver 230.

The light source driver control circuit 170 outputs the second vertical synchronization signal LVSYC for driving the backlight having a rate four times the rate of the image frame FIk. The second vertical synchronization signal LVSYC prescribes the light-emission frames FL1 to FL4. Each light-emission frame is equivalent to two periods of the horizontal synchronization signal PHSYC.

The timing control for the image data IM1(1) will now be described.

As shown in FIG. 9, in the division frame FB2 of the frame FA1, the image processing circuit 120 performs image processing on the image data IM1(1) and the dimming circuit 150 finds luminance information B11(1) and B12(1), based on the image-processed image data IM1(1). In the division frame FB3, the light source driver control circuit 170 updates the luminance information held by the first driver 241 with B11(1) and B12(1). In the division frame FB4, that is, in the light-emission frame FL1 of the image frame FI1, the display driver 230 updates the display in the scan area AR1 with the image-processed image data IM1(1).

As shown in FIG. 10, in the light-emission frames FL1 to FL4 of the image frame FI1, the first driver 241 causes the light source element groups LG11 and LG12 to emit light, based on the luminance information B11(1) and B12(1). The light-emission frame FL1 is taken as an example in this description. The first driver 241 switches the gate signal GATE1 to low level in the first half of the light-emission frame FL1 and outputs a PWM signal with a pulse width corresponding to the luminance information B11(1), as the channel signals CH1 to CH8. Thus, the light source element group LG11 emits light with the luminance represented by the luminance information B11(1). The first driver 241 switches the gate signal GATE2 to low level in the second half of the light-emission frame FL1 and outputs a PWM signal with a pulse width corresponding to the luminance information B12(1), as the channel signals CH1 to CH8. Thus, the light source element group LG12 emits light with the luminance represented by the luminance information B12(1).

The image data displayed on the display panel 220 during the period before the image frame FI1 is defined as image data IM1(0) to IM4(0) in the initial state. This image data may be not necessarily written onto the display panel 220 by the display driver 230. For example, the image data IM1(0) to IM4(0) in the initial state is black data. The luminance information held by the light source driver 240 before the division frame FB3 is defined as luminance information B11(0), B12(0), B21(0), B22(0), B31(0), B32(0) B41(0), B42(0) in the initial state. This luminance information may be not generated based on the image data IM1(0) to IM4(0). As shown in FIG. 9, for example, in the division frame FB1 preceding the division frame FB3, the light source driver control circuit 170 transmits the luminance information in the initial state to the light source driver 240.

The timing control for the image data IM2(1) will now be described.

As shown in FIG. 9, in the division frame FB3 of the frame FA1, the image processing circuit 120 performs image processing on the image data IM2(1) and the dimming circuit 150 finds luminance information B21(1) and B22(1), based on the image-processed image data IM2(1). In the division frame FB4, that is, in the light-emission frame FL1 of the image frame FI1, the light source driver control circuit 170 updates the luminance information held by the second driver 242 with B21(1) and B22(1). In the light-emission frame FL2, the display driver 230 updates the display in the scan area AR2 with the image-processed image data IM2(1).

As shown in FIG. 10, in the light-emission frames FL2 to FL4 of the image frame FI1 and the light-emission frame FL1 of the image frame FI2, the second driver 242 causes the light source element groups LG21 and LG22 to emit light, based on the luminance information B21(1) and B22 (1). The light-emission frame FL2 is taken as an example in this description. The second driver 242 switches the gate signal GATE1 to low level in the first half of the light-emission frame FL2 and outputs a PWM signal with a pulse width corresponding to the luminance information B21(1), as the channel signals CH1 to CH8. Thus, the light source element group LG21 emits light with the luminance represented by the luminance information B21(1). The second driver 242 switches the gate signal GATE2 to low level in the second half of the light-emission frame FL2 and outputs a PWM signal with a pulse width corresponding to the luminance information B22(1), as the channel signals CH1 to CH8. Thus, the light source element group LG22 emits light with the luminance represented by the luminance information B22(1).

In the light-emission frame FL1 of the image frame FI1, the second driver 242 causes the light source element groups LG21 and LG22 to emit light, based on the luminance information B21(0) and B22(0) in the initial state. The timing control for the image data IM3(1) will now be described.

As shown in FIG. 9, in the division frame FB4 of the frame FA1, that is, in the light-emission frame FL1 of the image frame FI1, the image processing circuit 120 performs image processing on the image data IM3(1) and the dimming circuit 150 finds luminance information B31(1) and B32(1), based on the image-processed image data IM3(1). In the light-emission frame FL2, the light source driver control circuit 170 updates the luminance information held by the third driver 243 with B31(1) and B32(1). In the light-emission frame FL3, the display driver 230 updates the display in the scan area AR3 with the image-processed image data IM3(1).

Although not illustrated in FIG. 10, in the light-emission frames FL3 and FL4 of the image frame FI1 and the light-emission frames FL1 and FL2 of the image frame FI2, the third driver 243 causes the light source element groups LG31 and LG32 to emit light, based on the luminance information B31(1) and B32(1).

The timing control for the image data IM4(1) will now be described.

As shown in FIG. 9, in the division frame FB1 of the frame FA2, that is, in the light-emission frame FL2 of the image frame FI1, the image processing circuit 120 performs image processing on the image data IM4(1) and the dimming circuit 150 finds luminance information B41(1) and B42(1), based on the image-processed image data IM4(1). In the light-emission frame FL3, the light source driver control circuit 170 updates the luminance information held by the fourth driver 244 with B41(1) and B42(1). In the light-emission frame FL4, the display driver 230 updates the display in the scan area AR4 with the image-processed image data IM4(1).

Although not illustrated in FIG. 10, in the light-emission frames FL4 of the image frame FI1 and the light-emission frames FL1 to FL3 of the image frame FI2, the fourth driver 244 causes the light source element groups LG41 and LG42 to emit light, based on the luminance information B41(1) and B42(1).

An overview of this embodiment is given below, using the first detailed configuration example. Similar matters can apply to second to fifth detailed configuration examples described later.

In this embodiment, the display device 200 includes the display panel 220 and the backlight device 210. The backlight device 210 has a plurality of light source elements. The display system 400 includes: the display driver 230 driving the display panel 220; the light source driver 240 driving the backlight device 210, based on luminance information that sets a luminance of the plurality of light source elements; and the display controller 100 controlling the display driver 230 and the light source driver 240. The light source driver 240 causes the plurality of light source elements to emit light, based on a light-emission frame update that is faster than an image frame update on the display panel 220 by the display driver 230. The light source driver 240 causes the plurality of light source elements to emit light in an i-th light-emission frame FLi. Here, i is an integer equal to or greater than 1. At this point, the luminance information of a light source element corresponding to a scan area ARi scanned by the display driver 230 in the i-th light-emission frame FLi, of the plurality of light source elements, is updated, based on image data in the scan area ARi, at a timing before the i-th light-emission frame FLi.

For example, it is assumed that i=1. As shown at the top left of FIG. 6, the display driver 230 scans the scan area AR1 in the light-emission frame FL1. The image data at this point is IM1(*k*+1). As shown at the top right of FIG. 5, the luminance information of the light source element groups LG11 and LG12 corresponding to the scan area AR1 is updated, based on the image data IM1(*k*+1) in the scan area AR1, at a timing before the light-emission frame FL1.

According to this embodiment, the luminance information of the light source element corresponding to the scan area ARi is updated, based on the image data in the scan area ARi scanned by the display driver 230 in the i-th light-emission frame FLi, at a timing before the i-th light-emission frame FLi. Thus, the light source element corresponding to the scan area ARi emits light in the i-th light-emission frame, based on the updated luminance information. That is, in the i-th light-emission frame, the display in the scan area is updated with the image data and the light source element corresponding to the scan area emits light with the light-emission luminance based on the image data. Thus, the image update in the scan area AR1 and the change in the luminance of the light-emitting element illuminating the scan area AR1 are synchronized with each other and take place in the same light-emission frame. Thus, the combination between the image displayed on the display panel and the luminance of the backlight becomes appropriate and the image quality is improved.

For example, as shown at the bottom right of FIG. 6, in the light-emission frame FL1, the light source element groups LG11, LG12 corresponding to the scan area AR1 emit light, based on the luminance information B11(*k*+1), B12(*k*+1) updated with the image data IM1(*k*+1) in the scan area AR1. Compared with the top left of the illustration, the image update in the scan area AR1 and the change in the light-emission luminance take place at a synchronized timing.

Also, in this embodiment, the light source driver 240 performs image frame update with the first to n-th light-emission frames FL1 to FLn in one image frame FIk of the image frame update. Here, n is an integer equal to or greater than 2. The areas scanned by the display driver 230 in the first to n-th light-emission frames FL1 to FLn are defined as first to n-th scan areas AR1 to ARn. At this point, in an (i−1)th light-emission frame FLi−1 preceding the i-th light-emission frame FLi, the luminance information of the light source element corresponding to the i-th scan area ARi is updated, based on the image data in the i-th scan area ARi, and the luminance information of the light source element corresponding to the other scan areas than the i-th scan area ARi is maintained. Here, i is an integer equal to or greater than 2 and equal to or smaller than n.

According to this embodiment, in the (i−1)th light-emission frame FLi−1 preceding the i-th light-emission frame FLi, the luminance information of the light source element corresponding to the i-th scan area ARi is updated, based on the image data in the i-th scan area ARi. Thus, in the i-th light-emission frame FLi, the display in the i-th scan area ARi is updated with the image data and the light source element corresponding to the i-th scan area ARi emits light with the light-emission luminance based on the image data. Also, in the other scan areas than the i-th scan area ARi, neither the image nor the light-emission luminance changes and therefore the timing is met.

Also, in this embodiment, the display controller 100 performs the update of the luminance information of the light source element corresponding to the i-th scan area ARi to the light source driver 240, based on the image data in the i-th scan area ARi, in the (i−1)th light-emission frame FLi−1.

According to this embodiment, since the display controller 100 performs the update of the luminance information to the light source driver 240, the luminance information held by the storage circuit in the light source driver 240 is updated. Thus, the light-emitting element emits light in the i-th light-emission frame FLi, based on the luminance information updated in the (i−1)th light-emission frame FLi−1.

Also, in this embodiment, the display controller 100 outputs the first vertical synchronization signal PVSYC to the display driver 230 and outputs the second vertical synchronization signal LVSYC to the light source driver 240. The first vertical synchronization signal PVSYC becomes active synchronously with the timing of image frame update. The second vertical synchronization signal LVSYC becomes active synchronously with the timing of light-emission frame update and has a faster rate than the rate of the first vertical synchronization signal PVSYC.

In this embodiment, the backlight device 210 emits light a plurality of times in one image frame. At this point, an area scanned at one light-emission frame update, on the display panel 220, is defined as a scan area. According to this embodiment, the timing when the display in the scan area is updated with image data and the timing when the light-emission luminance of the light-emitting element corresponding to the scan area is updated, based on the updated image data, are the same. Thus, the image quality is improved.

Also, in this embodiment, the second vertical synchronization signal LVSYC becomes active at first to n-th timings in one image frame of image frame update. Here, n is an integer equal to or greater than 2. The display driver 230 scans the i-th scan area ARi on the display panel 220 in the i-th light-emission frame FLi, which is the period between an i-th timing and the next timing. Here, i is an integer equal to or greater than 2 and equal to or smaller than n. The display controller 100 updates the luminance information of the light source element corresponding to the i-th scan area ARi, based on the image data in the i-th scan area ARi, in the (i−1)th light-emission frame FLi−1, which is the period between the (i−1)th timing and the i-th timing.

The next timing as in "the i-th timing and the next timing" refers to the (i+1)th timing in the same image frame as the image frame where the i-th timing occurs, when i is n−1 or smaller, or the first timing in an image frame next to the image frame where the i-th timing occurs, when i is n.

According to this embodiment, the second vertical synchronization signal LVSYC becomes active a plurality of times in one image frame, and the period between a timing when the second vertical synchronization signal LVSYC becomes active and the next timing when the second vertical synchronization signal LVSYC becomes active prescribes the light-emission frame. That is, the light-emission frame update is faster than the image frame update on the display panel.

Also, in this embodiment, the light source driver 240 includes a plurality of drivers. The display controller 100 performs the update of the luminance information to a driver that drives the light source element corresponding to the scan area, of the plurality of drivers, at a timing before the i-th light-emission frame FLi.

As shown in FIG. 3, the light source driver 240 includes, for example, the first to fourth drivers 241 to 244. For example, it is assumed that i=1. As shown at the top left of FIG. 6, in the light-emission frame FL1, the display driver 230 scans the scan area AR1. As shown at the top right of FIG. 5, the light source driver control circuit 170 performs the update of the luminance information to the first driver 241 driving the light source element groups LG11 and LG12 corresponding to the scan area AR1, at a timing before the light-emission frame FL1.

According to this embodiment, since the display driver 230 performs the update of the luminance information to the driver in charge of the light source element corresponding to the scan area, the luminance information of the light source element corresponding to the scan area, of the plurality of light source elements provided in the backlight device 210, can be updated. In the first detailed configuration example, one driver corresponds to one scan area. However, as in the detailed configuration examples described later, a plurality of drivers may correspond to one scan area, or one driver may correspond to a plurality of scan areas.

Also, in this embodiment, the display controller 100 performs dimming processing based on image analysis of the inputted image data IMA and outputs the luminance information acquired as the result of the dimming processing, to the light source driver 240. The display controller 100 performs image processing on the inputted image data IMA and outputs the image-processed image data IMB to the display driver 230.

According to this embodiment, the light-emission luminance of the backlight device 210 is dimmed, based on the image analysis of the inputted image data IMA. That is, the light-emission luminance changes according to the image data IMA. At this point, if the timing of image update on the display panel and the timing of luminance update at the backlight differ from each other, the image quality may drop. According to this embodiment, the image update in the scan area on the display panel 220 and the change in the luminance of the light-emitting element illuminating the scan area are synchronized with each other and take place in the same light-emission frame. Thus, the image quality is improved.

4. Second Detailed Configuration Example and Example of Timing Control Therefor

Figure 11:
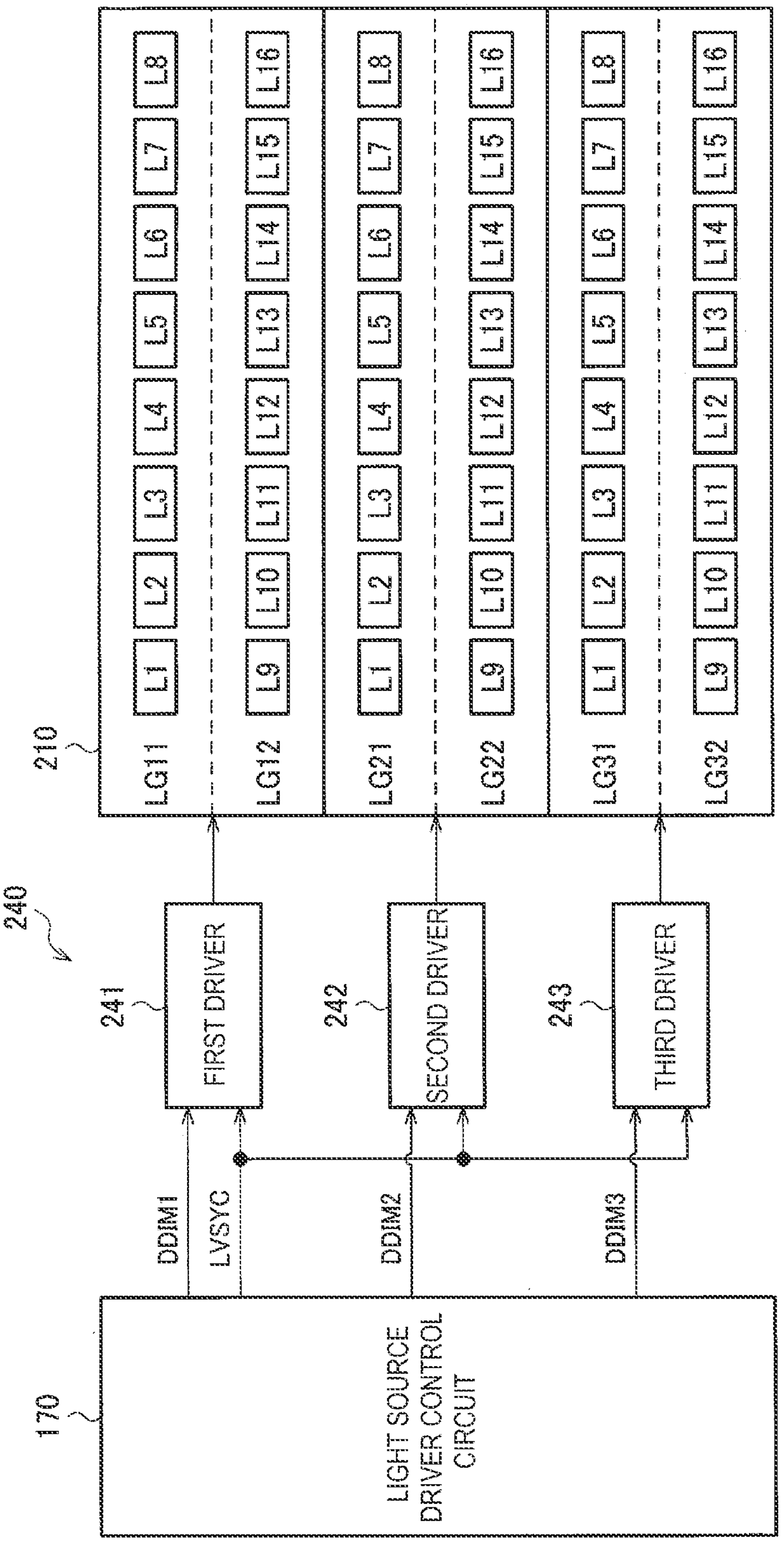
FIG. 11 shows a second detailed configuration example of the light source driver control circuit, the light source driver, and the backlight device.

FIG. 11 shows a second detailed configuration example of the light source driver control circuit, the light source driver, and the backlight device. In this configuration example, the number of light-emission frames differs from the number of light source drivers. An example where one image frame includes four light-emission frames and where the light source driver 240 includes three drivers is described. In the description below, the differences from the first detailed configuration example are mainly described. The parts whose description is omitted are similar to those in the first detailed configuration example.

The backlight device 210 includes light source elements arranged in a matrix of six rows by eight columns. The light source driver 240 includes first to third drivers 241 to 243. Each driver drives light source elements in an area horizontally divided into two rows in the backlight device 210.

Figure 12:
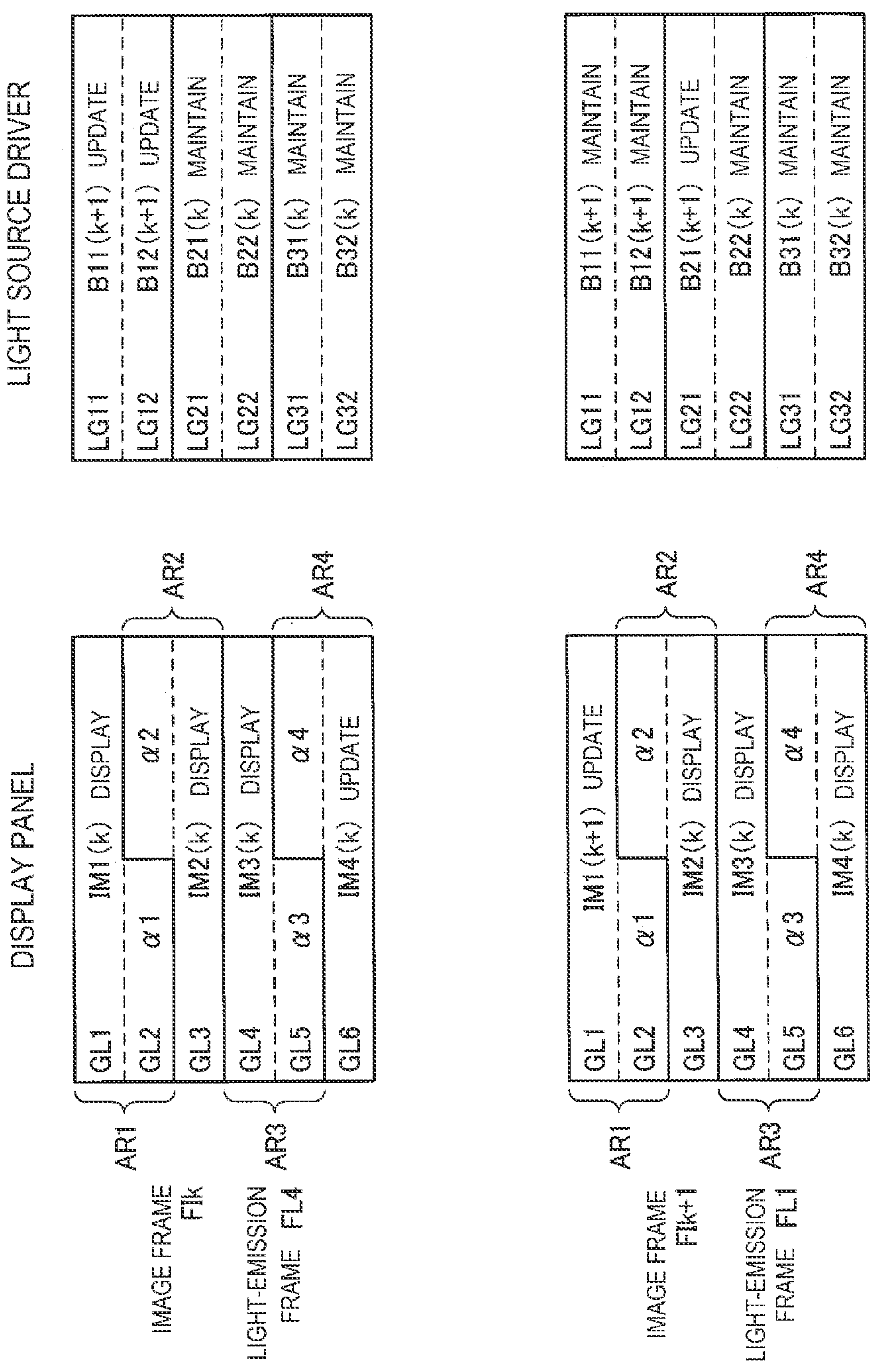
FIG. 12 explains timing control in a second detailed configuration example.
Figure 13:
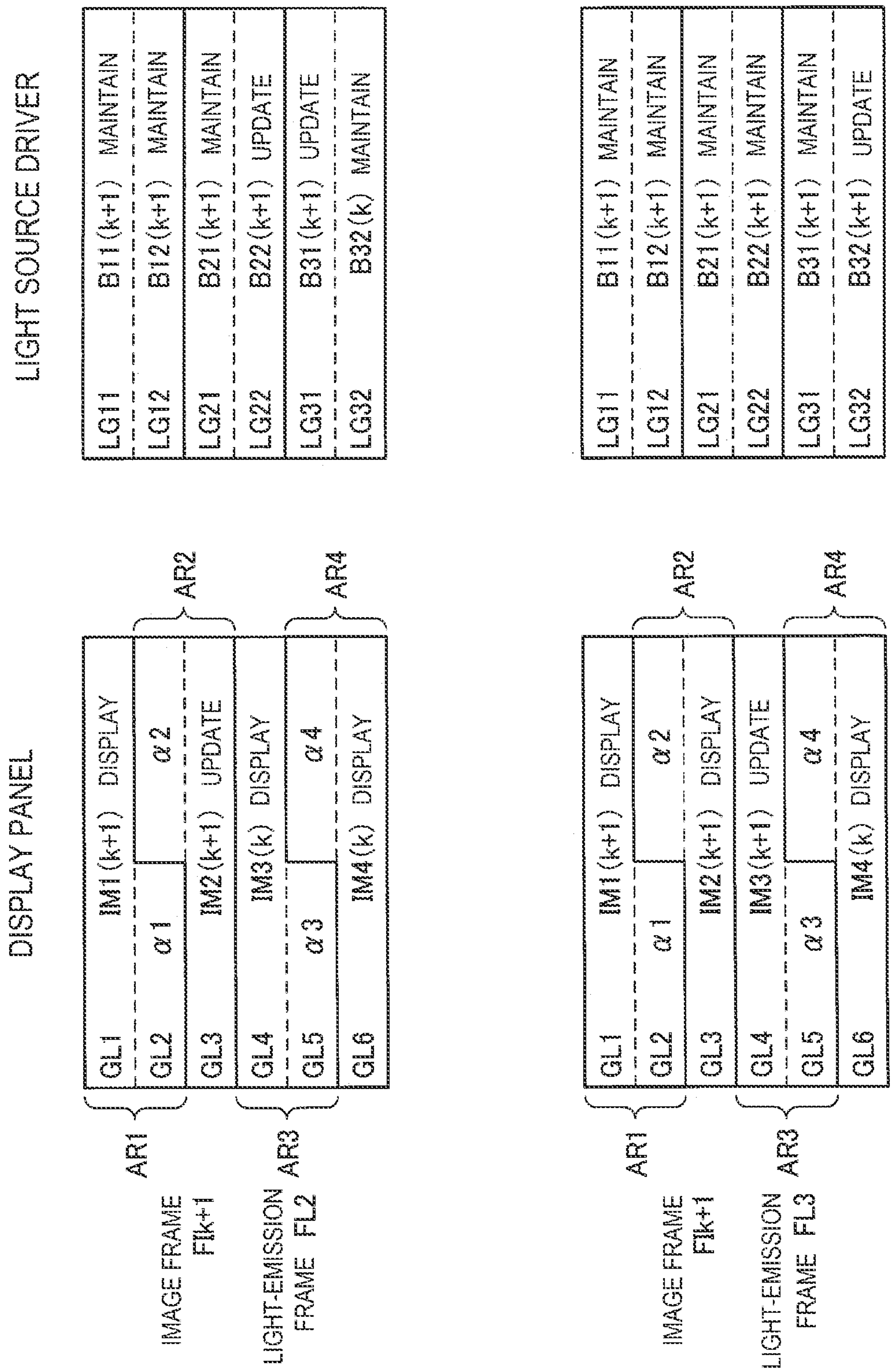
FIG. 13 explains the timing control in the second detailed configuration example.
Figure 14:
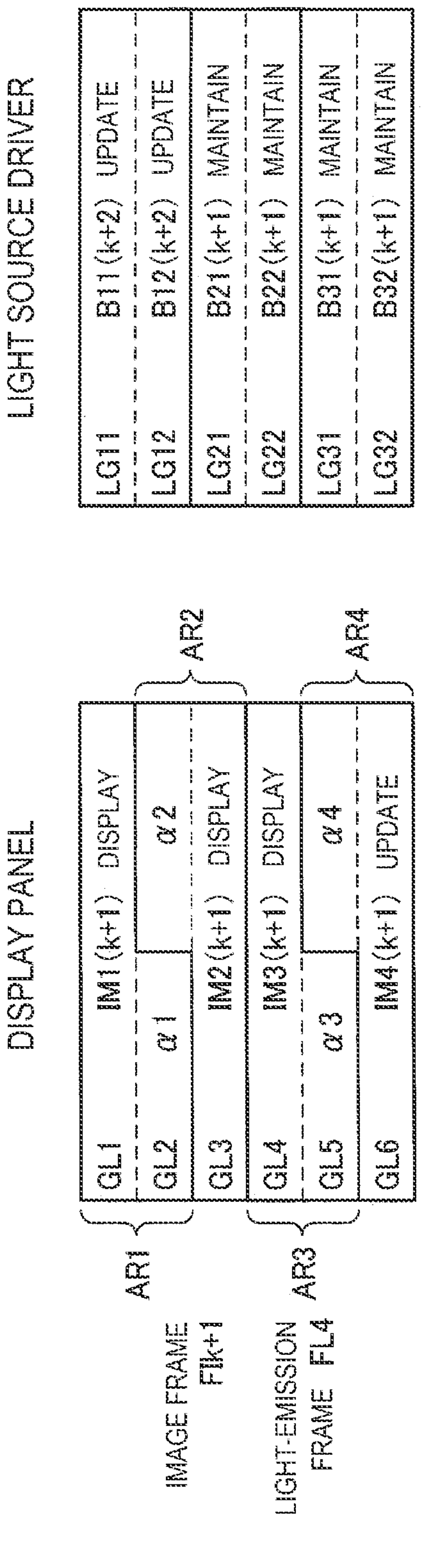
FIG. 14 explains the timing control in the second detailed configuration example.

FIGS. 12 to 14 explain the timing control in the second detailed configuration example.

The top of FIG. 12 shows a control example for the light-emission frame FL4 of the image frame FIk. As shown at the top left of the illustration, in an example, the pixel array in the display panel 220 is formed of six scan lines GL1 to GL6. Of the scan line GL2, which is equivalent to the boundary between the scan areas AR1 and AR2, the first half is defined as α1 and the second half is defined as α2. Of the scan line GL5, which is equivalent to the boundary between the scan areas AR3 and AR4, the first half is defined as α3 and the second half is defined as α4. In this case, the scan area AR1 is formed of the scan line GL1 and the first half α1 of the scan line GL2. The scan area AR2 is formed of the second half α2 of the scan line GL2 and the scan line GL3. The scan area AR3 is formed of the scan line GL4 and the first half α3 of the scan line GL5. The scan area AR4 is formed of the second half α4 of the scan line GL5 and the scan line GL6.

The display driver 230 scans the second half α4 of the scan line GL5 and the scan line GL6 in the light-emission frame FL4 of the image frame FIk and thus updates the display in the scan area AR4 with image data IM4(*k*). In the scan areas AR1, AR2, AR3, image data IM1(*k*), IM2(*k*), IM3(*k*) are already displayed and these image data are maintained.

As shown at the top left and right of the illustration, the light source element group LG11 of the backlight device 210 is arranged behind the scan line GL1 as viewed in a plan view of the display panel 220. Similarly, the light source element groups LG12, LG21, LG22, LG31, LG32 of the backlight device 210 are arranged behind the scan lines GL2, GL3, GL4, GL5, GL6.

As shown at the top right of the illustration, in the light-emission frame FL4 of the image frame FIk, the light source driver control circuit 170 updates the luminance information of the light source element group LG11 held by the light source driver 240 with B11(*k*+1) and updates the luminance information of the light source element group LG12 with B12(*k*+1). The luminance information B11(*k*+1) and B12(*k*+1) are dimmed, based on image data IM1(*k*+1)+α2. The image data IM1(*k*+1)+α2 is the image data IM1(*k*+1) and the image data of the second half α2 of the scan line GL2, of the image data IM2(*k*+1). The luminance information of the light source element groups LG21, LG22, LG31, LG32 held by the light source driver 240 is luminance information B21(*k*), B22(*k*), B31(*k*), B32(*k*). The light source driver control circuit 170 maintains this luminance information.

The bottom of FIG. 12 shows a control example for the light-emission frame FL1 of an image frame FIk+1. As shown at the bottom left of the illustration, the display driver 230 scans the scan line GL1 and the first half α1 of the scan line GL2 and thus updates the display in the scan area AR1 with the image data IM1(*k*+1). In the scan areas AR2, AR3, AR4, the image data IM2(*k*), IM3(*k*), IM4(*k*) are already displayed and these image data are maintained.

As shown at the bottom right of the illustration, the light source driver control circuit 170 updates the luminance information of the light source element group LG21 held by the light source driver 240 with B21(*k*+1). The luminance information B21(*k*+1) is dimmed, based on image data IM2(*k*+1)−α2. The image data IM2(*k*+1)−α2 is the image data of the scan line GL3, of the image data IM2(*k*+1). The luminance information of the light source element groups LG11, LG12, LG22, LG31, LG32 held by the light source driver 240 is the luminance information B11(*k*+1), B12(*k*+1), B22(*k*), B31(*k*), B32(*k*). The light source driver control circuit 170 maintains this luminance information.

The top of FIG. 13 shows a control example for the light-emission frame FL2 of the image frame FIk+1. As shown at the top left of the illustration, the display driver 230 scans the second half α2 of the scan line GL2 and the scan line GL3 and thus updates the display in the scan area AR2 with the image data IM2(*k*+1). In the scan areas AR1, AR3, AR4, the image data IM1(*k*+1), IM3(*k*), IM4(*k*) are already displayed and these image data are maintained.

As shown at the top right of the illustration, the light source driver control circuit 170 updates the luminance information of the light source element group LG22 held by the light source driver 240 with B22(*k*+1) and updates the luminance information of the light source element group LG31 with B31(*k*+1). The luminance information B22(*k*+1) and B31(*k*+1) are dimmed, based on image data IM3(*k*+1)+α4. The image data IM3(*k*+1)+α4 is the image data IM3(*k*+1) and the image data of the second half α4 of the scan line GL5, of the image data IM4(*k*+1). The luminance information of the light source element groups LG11, LG12, LG21, LG32 held by the light source driver 240 is the luminance information B11(*k*+1), B12(*k*+1), B21(*k*+1), B32(*k*). The light source driver control circuit 170 maintains this luminance information.

The bottom of FIG. 13 shows a control example for the light-emission frame FL3 of the image frame FIk+1. As shown at the bottom left of the illustration, the display driver 230 scans the scan line GL4 and the first half α3 of the scan line GL5 and thus updates the display in the scan area AR3 with the image data IM3(*k*+1). In the scan areas AR1, AR2, AR4, the image data IM1(*k*+1), IM2(*k*+1), IM4(*k*) are already displayed and these image data are maintained.

As shown at the bottom right of the illustration, the light source driver control circuit 170 updates the luminance information of the light source element group LG32 held by the light source driver 240 with B32(*k*+1). The luminance information B32(*k*+1) is dimmed, based on image data IM4(*k*+1)−α4. The image data IM4(*k*+1)−α4 is the image data of the scan line GL6, of the image data IM4(*k*+1). The luminance information of the light source element groups LG11, LG12, LG21, LG22, LG31 held by the light source driver 240 is the luminance information B11(*k*+1), B12(*k*+1), B21(*k*+1), B22(*k*+1), B31(*k*+1). The light source driver control circuit 170 maintains this luminance information.

FIG. 14 shows a control example for the light-emission frame FL4 of the image frame FIk+1. As shown at the left of the illustration, the display driver 230 scans the second half α4 of the scan line GL5 and the scan line GL6 and thus updates the display in the scan area AR4 with the image data IM4(*k*+1). In the scan areas AR1, AR2, AR3, the image data IM1(*k*+1), IM2(*k*+1), IM3(*k*+1) are already displayed and these image data are maintained.

As shown at the right of the illustration, the light source driver control circuit 170 updates the luminance information of the light source element group LG11 held by the light source driver 240 with B11(*k*+2) and updates the luminance information of the light source element group LG12 with B12(*k*+2). The luminance information B11(*k*+2) and B12(*k*+2) are dimmed, based on image data IM1(*k*+2)+α2. The image data IM1(*k*+2)+α2 is the image data IM1(*k*+2) and the image data of the second half α2 of the scan line GL2, of the image data IM2(*k*+2). The luminance information of the light source element groups LG21, LG22, LG31, LG32 held by the light source driver 240 is the luminance information B21(k+1), B22(k+1), B31(k+1), B32(k+1). The light source driver control circuit 170 maintains this luminance information.

Figure 15:
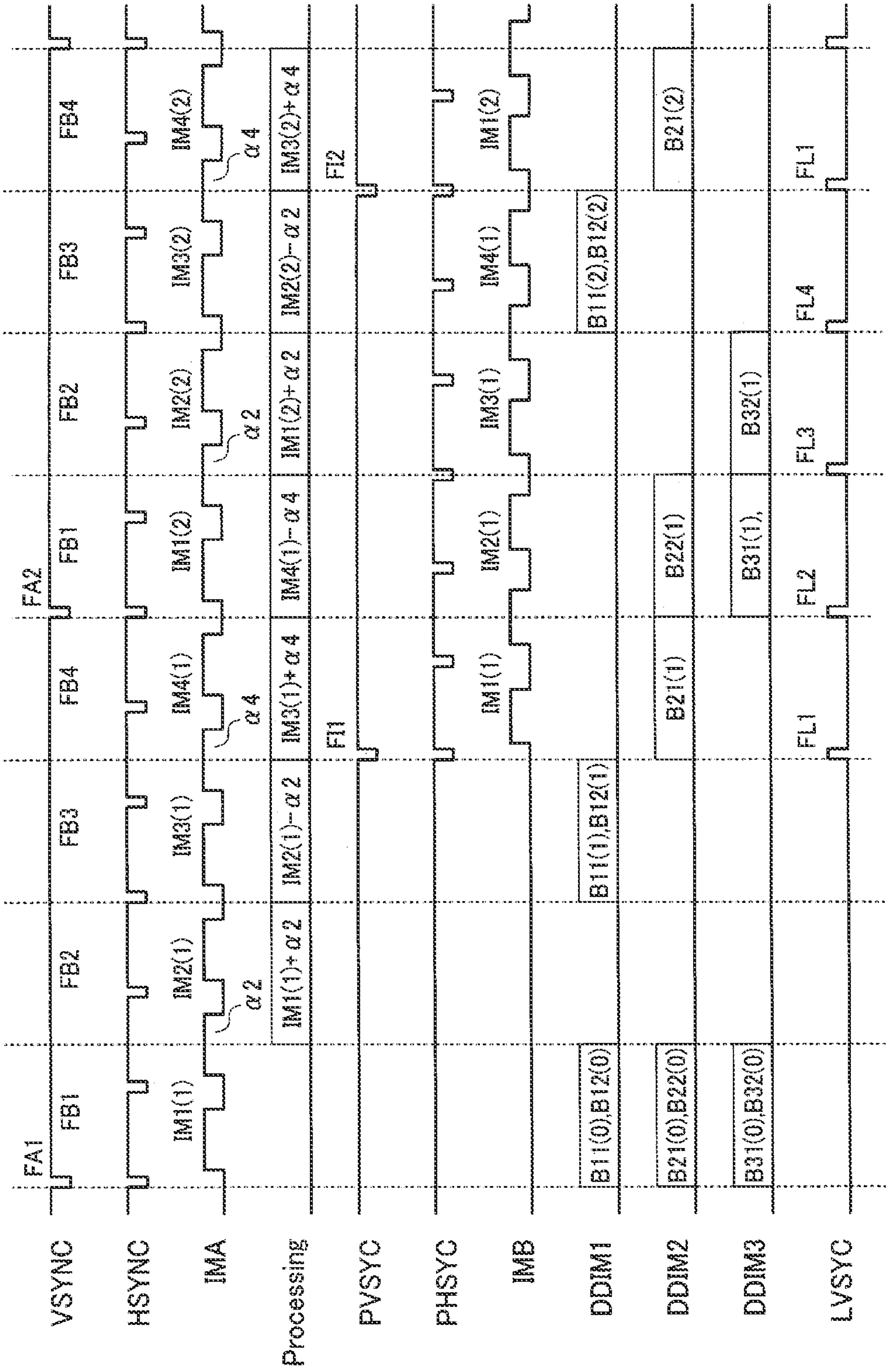
FIG. 15 shows a waveform example illustrating the timing control in the second detailed configuration example.
Figure 16:
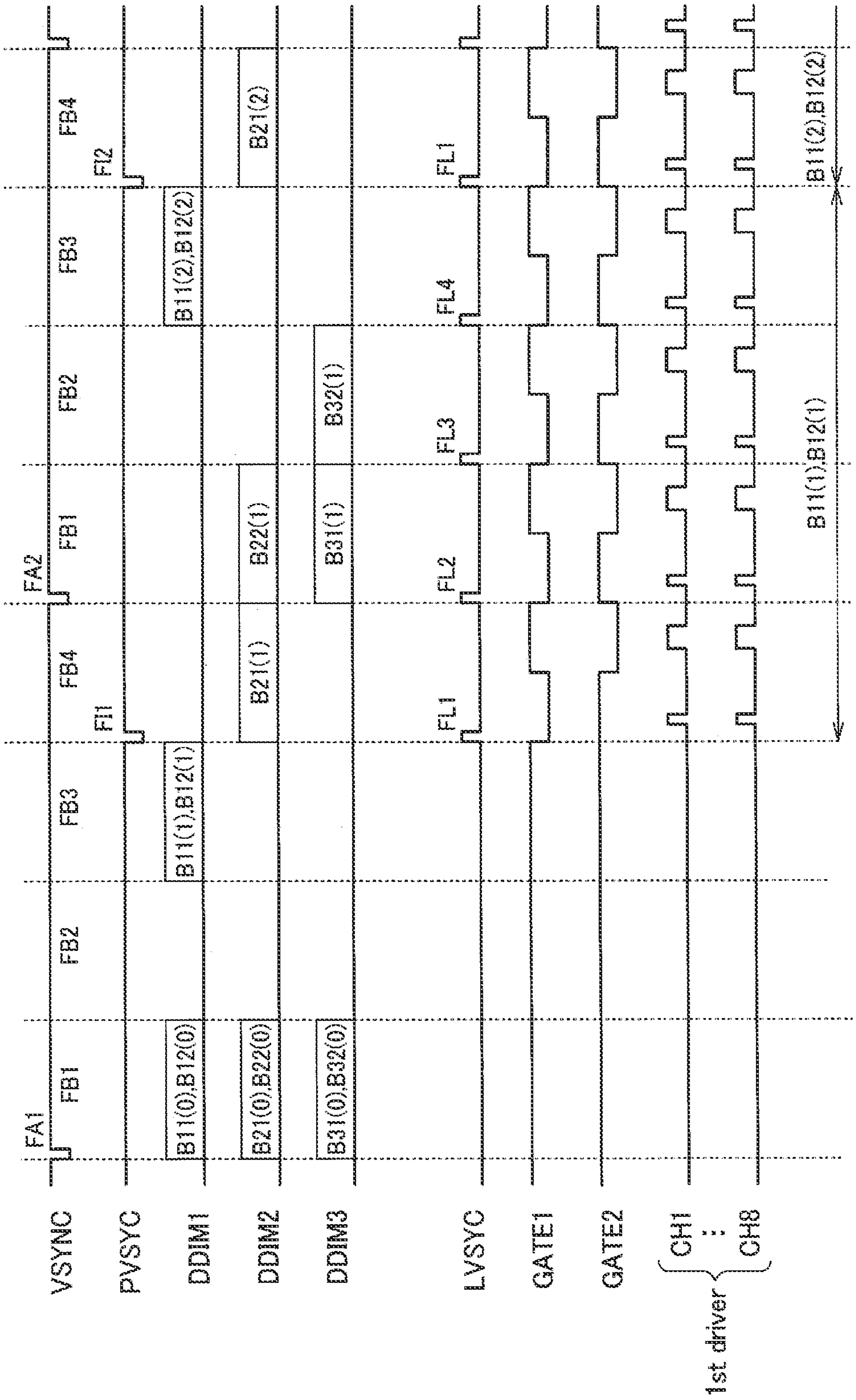
FIG. 16 shows a waveform example illustrating the timing control in the second detailed configuration example.

FIGS. 15 and 16 show waveform examples illustrating the timing control in the second detailed configuration example. Each of the division frames FB1 to FB4 is equivalent to 1.5 periods of the horizontal synchronization signal HSYNC.

The timing control for image data IM1(1)+α2 will now be described. IM1(1)+α2 is the image data IM1(1) and the image data of the second half α2 of the scan line GL2, of the image data IM2(1).

As shown in FIG. 15, in the division frame FB2 of the frame FA1, the image processing circuit 120 performs image processing on the image data IM1(1)+α2 and the dimming circuit 150 finds luminance information B11(1) and B12(1), based on the image-processed image data IM1(1)+α2. In the division frame FB3, the light source driver control circuit 170 updates the luminance information held by the first driver 241 with B11(1) and B12(1). In the division frame FB4, that is, in the light-emission frame FL1 of the image frame FI1, the display driver 230 updates the display in the scan area AR1 with the image-processed image data IM1(1).

As shown in FIG. 16, in the light-emission frames FL1 to FL4 of the image frame FI1, the first driver 241 causes the light source element groups LG11 and LG12 to emit light, based on the luminance information B11(1) and B12(1).

The timing control for the image data IM2(1)−α2 will now be described. IM2(1)−α2 is the image data of the scan line GL3, of the image data IM2(1).

As shown in FIG. 15, in the division frame FB3 of the frame FA1, the image processing circuit 120 performs image processing on the image data IM2(1)−α2 and the dimming circuit 150 finds luminance information B21(1), based on the image-processed image data IM2(1)−α2. In the division frame FB4, that is, in the light-emission frame FL1 of the image frame FI1, the light source driver control circuit 170 updates a part of the luminance information held by the second driver 242 with B21(1). In the light-emission frame FL2, the display driver 230 updates the display in the scan area AR2 with the image-processed image data IM2(1).

Although not illustrated in FIG. 16, in the light-emission frames FL2 to FL4 of the image frame FI1 and the light-emission frame FL1 of the image frame FI2, the second driver 242 causes the light source element group LG21 to emit light, based on the luminance information B21(1).

The timing control for image data IM3(1)+α4 will now be described. IM3(1)+α4 is the image data IM3(1) and the image data of the second half α4 of the scan line GL5, of the image data IM4(1).

As shown in FIG. 15, in the division frame FB4 of the frame FA1, that is, in the light-emission frame FL1 of the image frame FI1, the image processing circuit 120 performs image processing on the image data IM3(1)+α4 and the dimming circuit 150 finds luminance information B22(1) and B31(1), based on the image-processed image data IM3(1)+α4. In the light-emission frame FL2, the light source driver control circuit 170 updates a part of the luminance information held by the second driver 242 with B22(1) and updates a part of the luminance information held by the third driver 243 with B31(1). In the light-emission frame FL3, the display driver 230 updates the display in the scan area AR3 with the image-processed image data IM3(1).

Although not illustrated in FIG. 16, in the light-emission frames FL3 and FL4 of the image frame FI1 and the light-emission frames FL1 and FL2 of the image frame FI2, the second driver 242 causes the light source element group LG22 to emit light, based on the luminance information B22(1), and the third driver 243 causes the light source element group LG31 to emit light, based on the luminance information B31(1).

The timing control for image data IM4(1)−α4 will now be described. IM4(1)−α4 is the image data of the scan line GL6, of the image data IM4(1).

As shown in FIG. 15, in the division frame FB1 of the frame FA2, that is, in the light-emission frame FL2 of the image frame FI1, the image processing circuit 120 performs image processing on the image data IM4(1)−α4 and the dimming circuit 150 finds luminance information B32(1), based on the image-processed image data IM4(1)−α4. In the light-emission frame FL3, the light source driver control circuit 170 updates a part of the luminance information held by the third driver 243 with B32(1). In the light-emission frame FL4, the display driver 230 updates the display in the scan area AR4 with the image-processed image data IM4(1).

Although not illustrated in FIG. 16, in the light-emission frame FL4 of the image frame FI1 and the light-emission frames FL1 to FL3 of the image frame FI2, the third driver 243 causes the light source element group LG32 to emit light, based on the luminance information B32(1).

5. Third Detailed Configuration Example and Example of Timing Control Therefor

Figure 17:
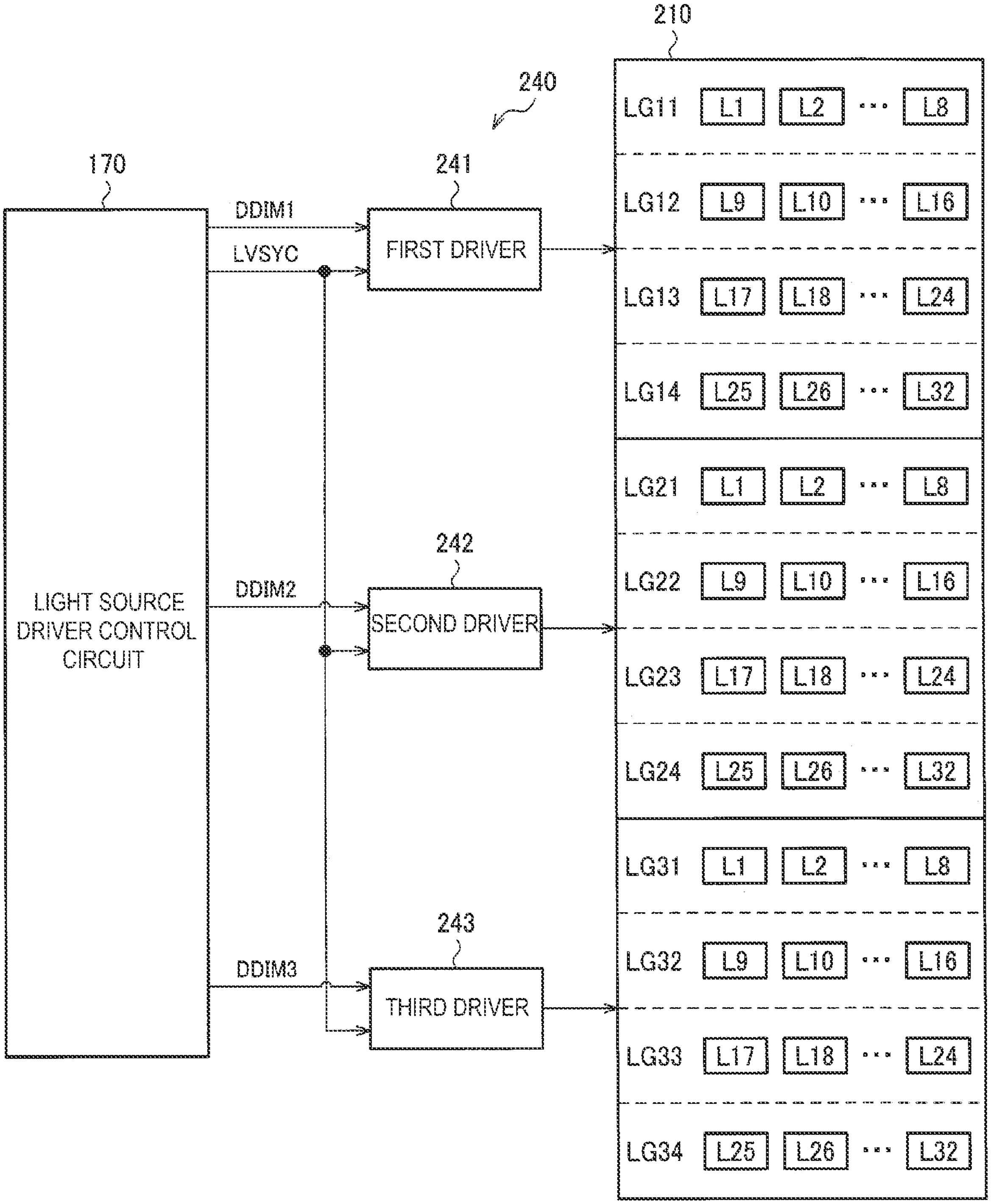
FIG. 17 shows a third detailed configuration example of the light source driver control circuit, the light source driver, and the backlight device.

FIG. 17 shows a third detailed configuration example of the light source driver control circuit, the light source driver, and the backlight device. This configuration example is another example of the case where the number of light-emission frames differs from the number of light source drivers. In the description below, the differences from the first or second detailed configuration example are mainly described. The parts whose description is omitted are similar to those in the first or second detailed configuration example.

The backlight device 210 includes light source elements arranged in a matrix of twelve rows by eight columns. The light source driver 240 includes first to third drivers 241 to 243. One driver drives 32 light source elements, which are defined as light source elements L1 to L32. Each driver drives light source elements in an area horizontally divided into four rows in the backlight device 210. That is, the first driver 241 drives light source element groups LG11 to LG14 in the first to fourth rows. The second driver 242 drives light source element groups LG21 to LG24 in the fifth to eighth rows. The third driver 243 drives light source element groups LG31 to LG34 in the ninth to twelfth rows.

FIGS. 18 to 22 explain the timing control in the third detailed configuration example.

FIG. 18 shows a control example for the light-emission frame FL4 of the image frame FIk. As shown at the left of the illustration, in an example, the pixel array in the display panel 220 is formed of twelve scan lines GL1 to GL12. Each of the scan areas AR1 to AR4 is formed of three scan lines. That is, the scan area AR1 is formed of the scan lines GL1 to GL3. Similarly, the scan areas AR2, AR3, AR4 are formed of the scan lines GL4 to GL6, GL7 to GL9, GL10 to GL12, respectively.

The display driver 230 scans the scan lines GL10 to GL12 and thus updates the display in the scan area AR4 with the image data IM4(k). In the scan areas AR1, AR2, AR3, the image data IM1(k), IM2(k), IM3(k) are already displayed and these image data are maintained.

As shown at the left and right of the illustration, the light source element group LG11 of the backlight device 210 is arranged behind the scan line GL1 as viewed in a plan view of the display panel 220. Similarly, the light source element groups LG12 to LG14, LG21 to LG24, LG31 to LG34 of the backlight device 210 are arranged behind the scan lines GL2 to GL4, GL5 to GL8, GL9 to GL12, respectively.

As shown at the right of the illustration, the light source driver control circuit 170 updates the luminance information of the light source element group LG11 held by the light source driver 240 with B11(*k*+1), updates the luminance information of the light source element group LG12 with B12(*k*+1), and updates the luminance information of the light source element group LG13 with B13(*k*+1). The luminance information B11(*k*+1), B12(*k*+1), and B13(*k*+1) are dimmed, based on image data IM1(*k*+1). The luminance information of the light source element groups LG14, LG21 to LG24, LG31 to LG34 held by the light source driver 240 is luminance information B14(*k*), B21(*k*) to B24(*k*), B31(*k*) to B34(*k*). The light source driver control circuit 170 maintains this luminance information.

Figure 19:
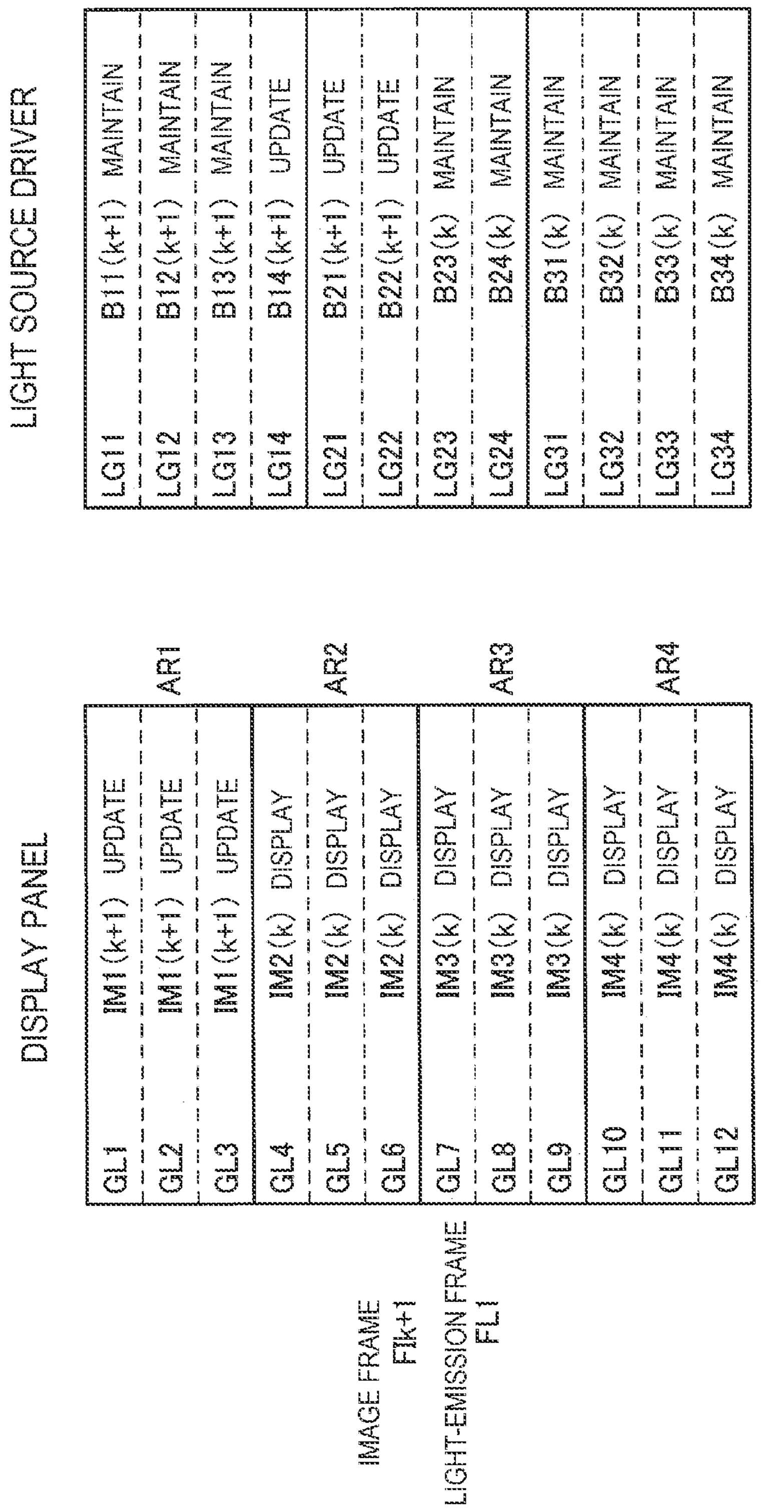
FIG. 19 explains the timing control in the third detailed configuration example.

FIG. 19 shows a control example for the light-emission frame FL1 of the image frame FIk+1. As shown at the left of the illustration, the display driver 230 scans the scan lines GL1 to GL3 and thus updates the display in the scan area AR1 with the image data IM1(*k*+1). In the scan areas AR2, AR3, AR4, the image data IM2(*k*), IM3(*k*), IM4(*k*) are already displayed and these image data are maintained.

As shown at the right of the illustration, the light source driver control circuit 170 updates the luminance information of the light source element group LG14 held by the light source driver 240 with B14(*k*+1), updates the luminance information of the light source element group LG21 with B21(*k*+1), and updates the luminance information of the light source element group LG22 with B22(*k*+1). The luminance information B14(*k*+1), B21(*k*+1), and B22(*k*+1) are dimmed, based on image data IM2(*k*+1). The luminance information of the light source element groups LG11 to LG13, LG23, LG24, LG31 to LG34 held by the light source driver 240 is the luminance information B11(*k*+1) to B13 (*k*+1), B23 (*k*), B24 (*k*), B31 (*k*) to B34(*k*). The light source driver control circuit 170 maintains this luminance information.

Figure 20:
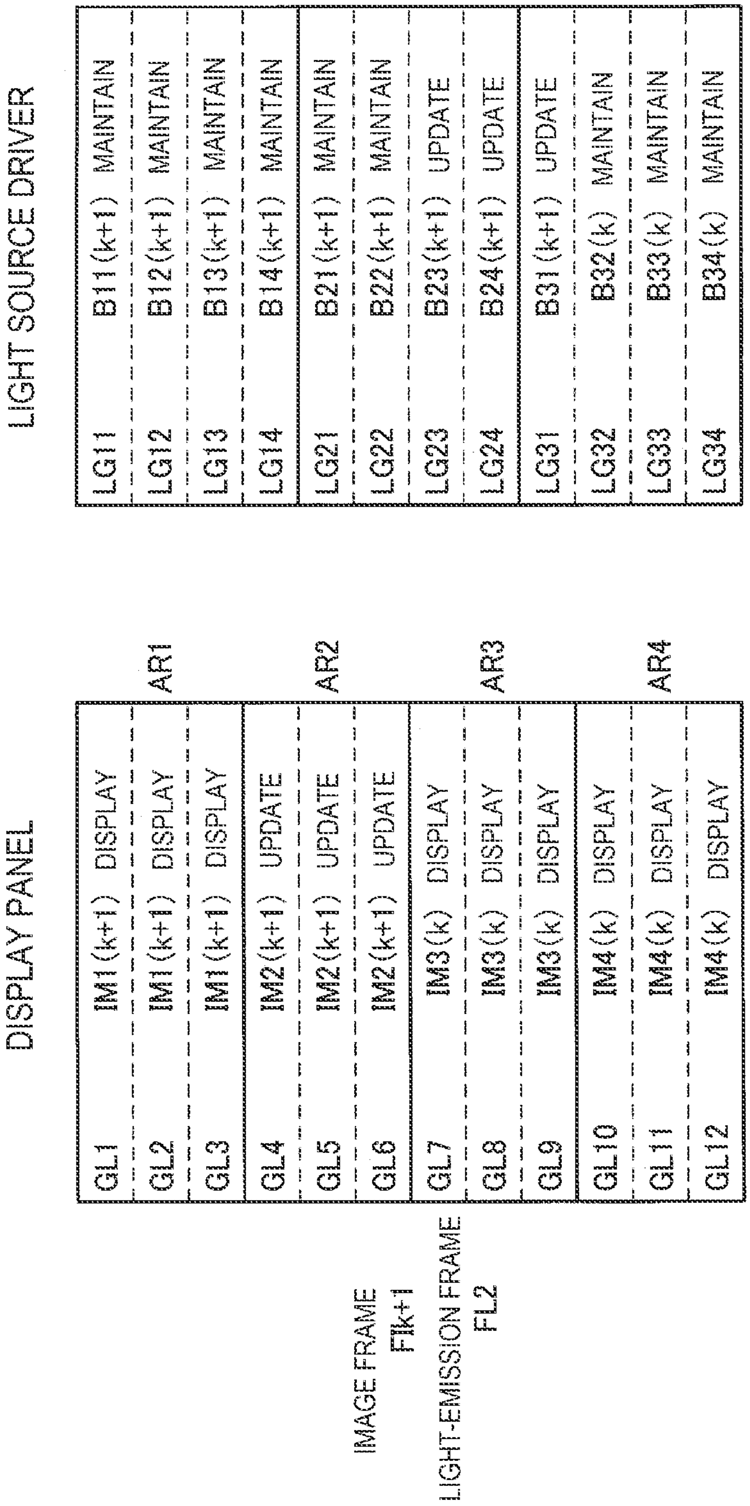
FIG. 20 explains the timing control in the third detailed configuration example.

FIG. 20 shows a control example for the light-emission frame FL2 of the image frame FIk+1. As shown at the left of the illustration, the display driver 230 scans the scan lines GL4 to GL6 and thus updates the display in the scan area AR2 with the image data IM2(*k*+1). In the scan areas AR1, AR3, AR4, the image data IM1(*k*+1), IM3(*k*), IM4(*k*) are already displayed and these image data are maintained.

As shown at the right of the illustration, the light source driver control circuit 170 updates the luminance information of the light source element group LG23 held by the light source driver 240 with B23(*k*+1), updates the luminance information of the light source element group LG24 with B24(*k*+1), and updates the luminance information of the light source element group LG31 with B31(*k*+1). The luminance information B23(*k*+1), B24(*k*+1), and B31(*k*+1) are dimmed, based on image data IM3(*k*+1). The luminance information of the light source element groups LG11 to LG14, LG21, LG22, LG32 to LG34 held by the light source driver 240 is the luminance information B11(*k*+1) to B14 (*k*+1), B21(*k*+1), B22(*k*+1), B32(*k*) to B34(*k*). The light source driver control circuit 170 maintains this luminance information.

Figure 21:
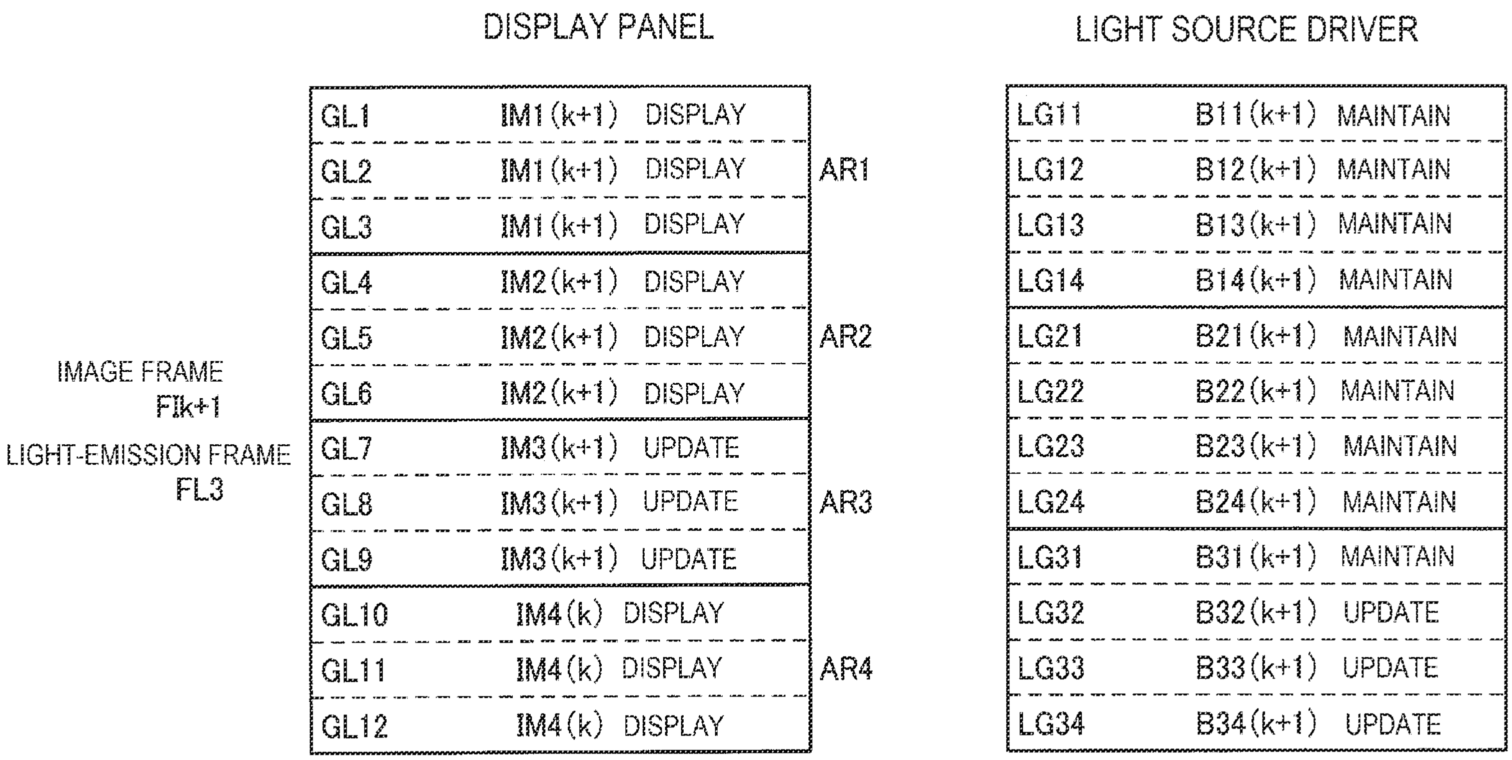
FIG. 21 explains the timing control in the third detailed configuration example.

FIG. 21 shows a control example for the light-emission frame FL3 of the image frame FIk+1. As shown at the left of the illustration, the display driver 230 scans the scan lines GL7 to GL9 and thus updates the display in the scan area AR3 with the image data IM3(*k*+1). In the scan areas AR1, AR2, AR4, the image data IM1(*k*+1), IM2(*k*+1), IM4(*k*) are already displayed and these image data are maintained.

As shown at the right of the illustration, the light source driver control circuit 170 updates the luminance information of the light source element group LG32 held by the light source driver 240 with B32(*k*+1), updates the luminance information of the light source element group LG33 with B33(*k*+1), and updates the luminance information of the light source element group LG34 with B34(*k*+1). The luminance information B32(*k*+1), B33(*k*+1), and B34(*k*+1) are dimmed, based on image data IM4(*k*+1). The luminance information of the light source element groups LG11 to LG14, LG21 to LG24, LG31 held by the light source driver 240 is the luminance information B11(*k*+1) to B14(*k*+1), B21(*k*+1) to B24(*k*+1), B31(*k*+1). The light source driver control circuit 170 maintains this luminance information.

FIG. 22 shows a control example for the light-emission frame FL4 of the image frame FIk+1. As shown at the left of the illustration, the display driver 230 scans the scan lines GL10 to GL12 and thus updates the display in the scan area AR4 with the image data IM4(*k*+1). In the scan areas AR1, AR2, AR3, the image data IM1(*k*+1), IM2(*k*+1), IM3(*k*+1) are already displayed and these image data are maintained.

As shown at the right of the illustration, the light source driver control circuit 170 updates the luminance information of the light source element group LG11 held by the light source driver 240 with B11(*k*+2), updates the luminance information of the light source element group LG12 with B12(*k*+2), and updates the luminance information of the light source element group LG13 with B13(*k*+2). The luminance information B11(*k*+2), B12(*k*+2), and B13(*k*+2) are dimmed, based on image data IM1(*k*+2). The luminance information of the light source element groups LG14, LG21 to LG24, LG31 to LG34 held by the light source driver 240 is the luminance information B14(*k*+1), B21(*k*+1) to B24 (*k*+1), B31(*k*+1) to B34(*k*+1). The light source driver control circuit 170 maintains this luminance information.

Figure 23:
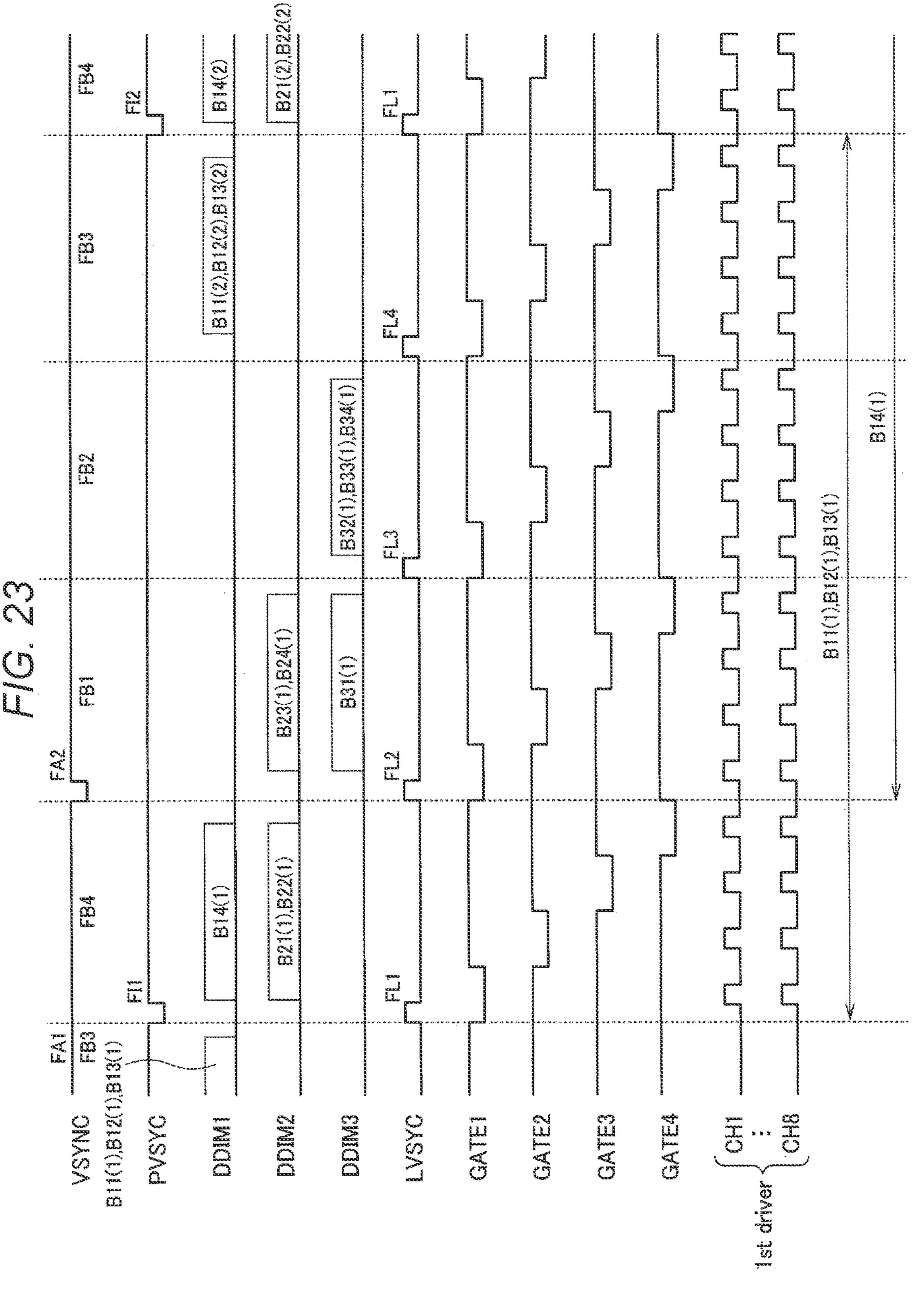
FIG. 23 shows a waveform example illustrating the timing control in the third detailed configuration example.

FIG. 23 shows a waveform example illustrating the timing control in the third detailed configuration example. In FIG. 23, the illustration of the horizontal synchronization signal, the image data, and the processing timing is omitted. Each of the division frames FB1 to FB4 is equivalent to three periods of the horizontal synchronization signal HSYNC.

The timing control for the image data IM1(1) will now be described. In the division frame FB3, the light source driver control circuit 170 updates a part of the luminance information held by the first driver 241 with B11(1), B12(1), and B13(1). The luminance information B11(1), B12(1), and B13(1) are computed, based on the image data IM1(1) in the division frame FB2. In the division frame FB4, that is, in the light-emission frame FL1 of the image frame FI1, the display driver 230 updates the display in the scan area AR1 with the image-processed image data IM1(1).

In the light-emission frames FL1 to FL4 of the image frame FI1, the first driver 241 causes the light source element groups LG11, LG12, and LG13 to emit light, based on the luminance information B11(1), B12(1), and B13(1).

The timing control for the image data IM2(1) will now be described. In the division frame FB4 of the frame FA1, that is, in the light-emission frame FL1 of the image frame FI1, the light source driver control circuit 170 updates a part of the luminance information held by the first driver 241 with B14(1) and updates a part of the luminance information held by the second driver 242 with B21(1) and B22(1). The luminance information B14(1), B21(1), and B22(1) are computed, based on the image data IM2(1) in the division frame FB3. In the light-emission frame FL2, the display driver 230 updates the display in the scan area AR2 with the image-processed image data IM2(1).

In the light-emission frames FL2 to FL4 of the image frame FI1 and the light-emission frame FL1 of the image frame FI2, the first driver 241 causes the light source element group LG14 to emit light, based on the luminance information B14(1), and the second driver 242 causes the light source element groups LG21 and LG22 to emit light, based on the luminance information B21(1) and B22(1).

The timing control for the image data IM3(1) will now be described. In the division frame FB1 of the frame FA2, that is, in the light-emission frame FL2 of the image frame FI1, the light source driver control circuit 170 updates a part of the luminance information held by the second driver 242 with B23(1) and B24(1) and updates a part of the luminance information held by the third driver 243 with B31(1). The luminance information B23(1), B24(1), and B31(1) are computed, based on the image data IM3(1) in the light-emission frame FL1. In the light-emission frame FL3, the display driver 230 updates the display in the scan area AR3 with the image-processed image data IM3(1).

In the light-emission frames FL3 and FL4 of the image frame FI1 and the light-emission frames FL1 and FL2 of the image frame FI2, the second driver 242 causes the light source element groups LG23 and LG24 to emit light, based on the luminance information B23(1) and B24(1), and the third driver 243 causes the light source element group LG31 to emit light, based on the luminance information B31(1).

The timing control for the image data IM4(1) will now be described. In the division frame FB2 of the frame FA2, that is, in the light-emission frame FL3 of the image frame FI1, the light source driver control circuit 170 updates a part of the luminance information held by the third driver 243 with B32(1) to B34(1). The luminance information B32(1) to B34(1) are computed, based on the image data IM4(1) in the light-emission frame FL2. In the light-emission frame FL4, the display driver 230 updates the display in the scan area AR4 with the image-processed image data IM4(1).

In the light-emission frames FL4 of the image frame FI1 and the light-emission frames FL1 to FL3 of the image frame FI2, the third driver 243 causes the light source element groups LG32 to LG34 to emit light, based on the luminance information B32(1) to B34(1).

6. Fourth Detailed Configuration Example and Example of Timing Control Therefor

Figure 24:
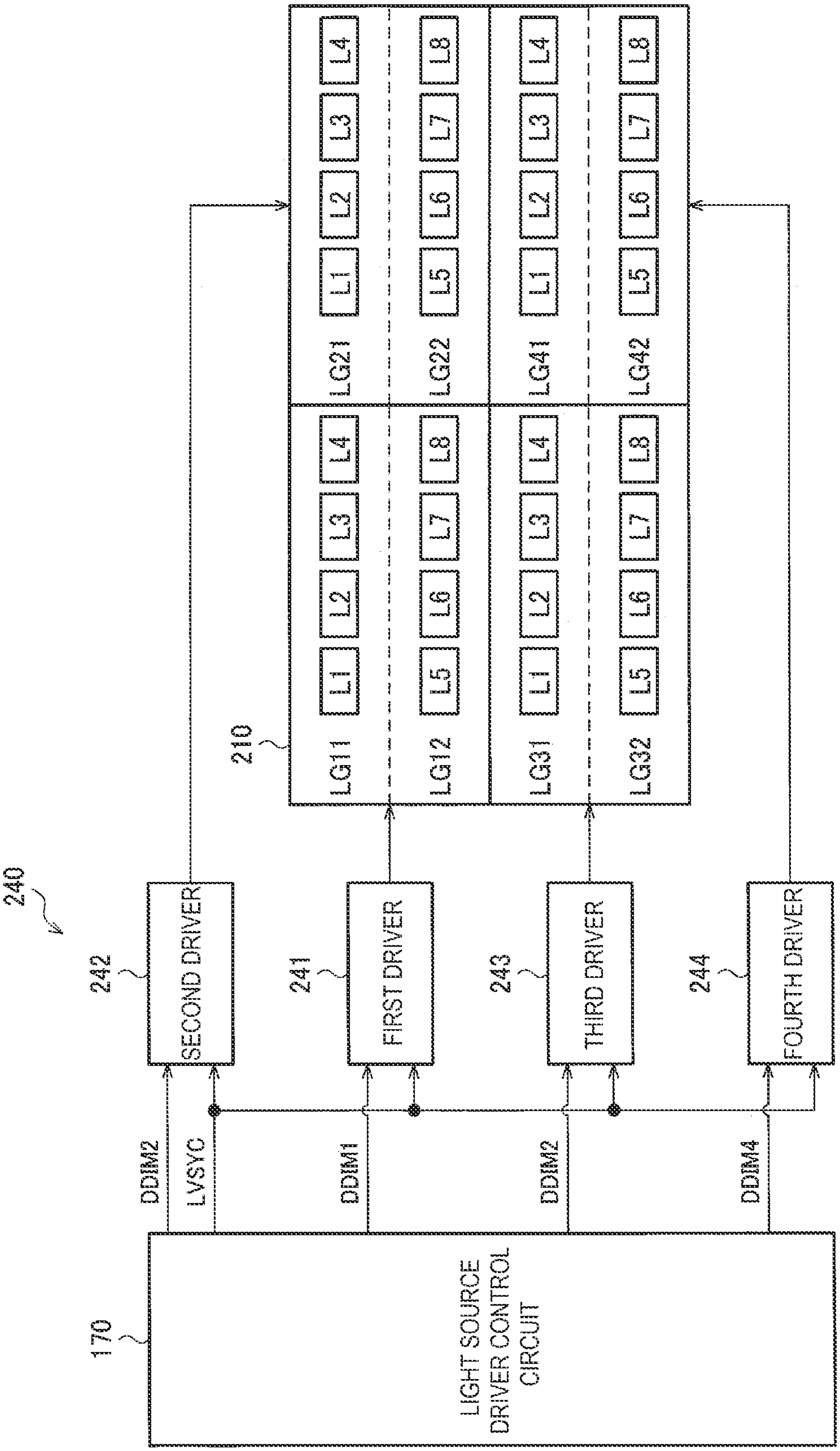
FIG. 24 shows a fourth detailed configuration example of the light source driver control circuit, the light source driver, and the backlight device.

FIG. 24 shows a fourth detailed configuration example of the light source driver control circuit, the light source driver, and the backlight device. This configuration example is an example where the area of the backlight which each driver of the light source driver is in charge of is horizontally and vertically divided. In the description below, the differences from the first, second or third detailed configuration example are mainly described. The parts whose description is omitted are similar to those in the first, second or third detailed configuration example.

The backlight device 210 includes light source elements arranged in a matrix of four rows by eight columns. The light source driver 240 includes first to fourth drivers 241 to 244. One driver drives eight light source elements, which are defined as light source elements L1 to L8. Each driver drives light source elements in an area divided horizontally into two rows and vertically into four columns in the backlight device 210. That is, the first driver 241 drives the light source element group LG11 in the first row and the light source element group LG12 in the second row, in the first to fourth columns. The second driver 242 drives the light source element group LG21 in the first row and the light source element group LG22 in the second row, in the fifth to eighth columns. The third driver 243 drives the light source element group LG31 in the third row and the light source element group LG32 in the fourth row, in the first to fourth columns. The fourth driver 244 drives the light source element group LG41 in the third row and the light source element group LG42 in the fourth row, in the fifth to eighth columns.

Figure 26:
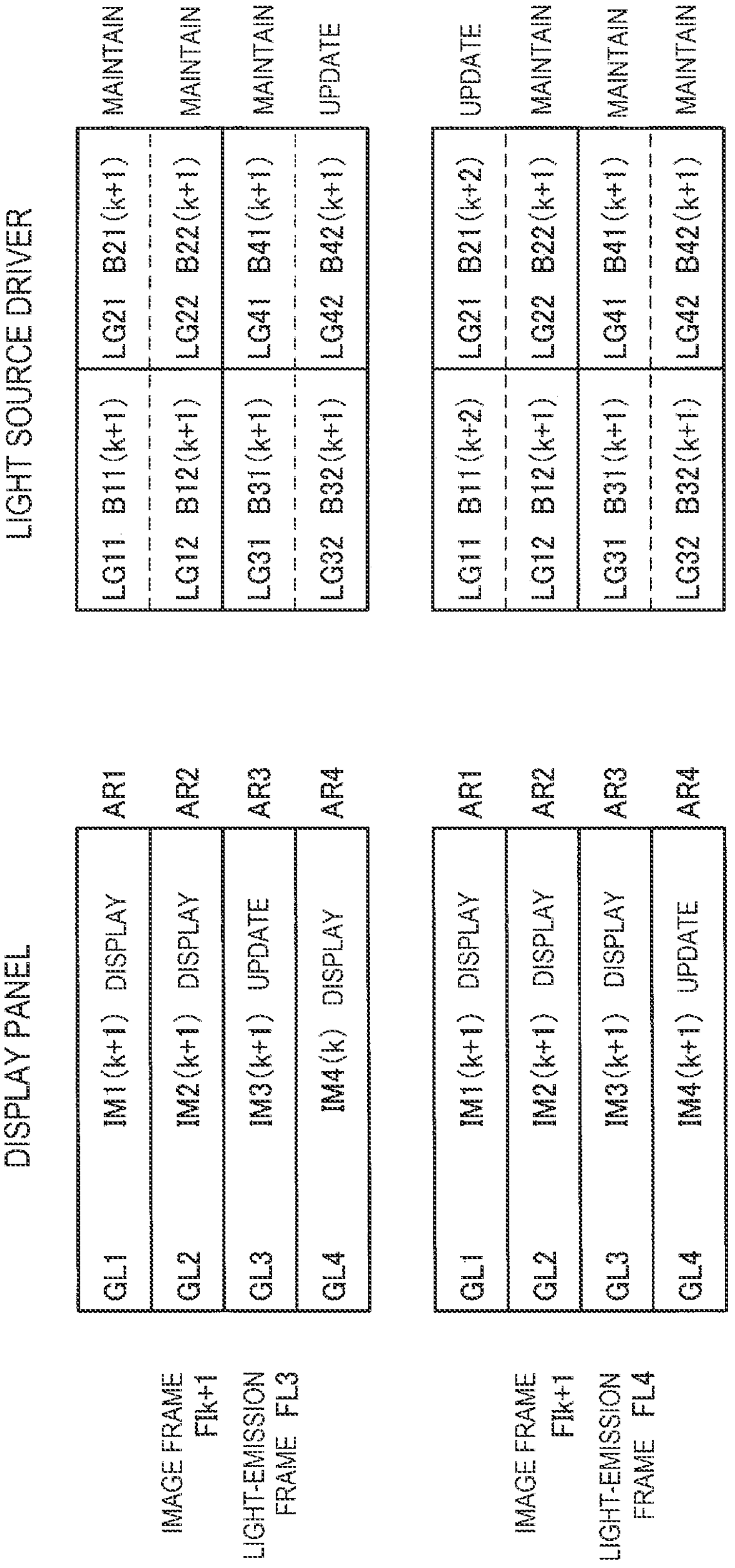
FIG. 26 explains the timing control in the fourth detailed configuration example.

FIGS. 25 and 26 explain the timing control in the fourth detailed configuration example.

The top of FIG. 25 shows a control example for the light-emission frame FL4 of the image frame FIk. As shown at the left of the illustration, in an example, the pixel array in the display panel 220 is formed of four scan lines GL1 to GL4. Each of the scan areas AR1 to AR4 is formed of one scan line. That is, the scan area AR1 is formed of the scan line GL1. Similarly, the scan areas AR2, AR3, AR4 are formed of the scan lines GL2, GL3, GL4, respectively.

The display driver 230 scans the scan line GL4 and thus updates the display in the scan area AR4 with the image data IM4(*k*). In the scan areas AR1, AR2, AR3, the image data IM1(*k*), IM2(*k*), IM3(*k*) are already displayed and these image data are maintained.

As shown at the left and right of the illustration, the light source element groups LG11 and LG21 of the backlight device 210 are arranged behind the scan line GL1 as viewed in a plan view of the display panel 220. Similarly, the light source element groups LG12 and LG22, LG31 and LG41, LG32 and LG42 of the backlight device 210 are arranged behind the scan lines GL2, GL3, GL4, respectively.

As shown at the right of the illustration, the light source driver control circuit 170 updates the luminance information of the light source element group LG11 held by the light source driver 240 with B11(*k*+1) and updates the luminance information of the light source element group LG21 with B21(*k*+1). The luminance information B11(*k*+1) and B21 (*k*+1) are dimmed, based on image data IM1(*k*+1). The luminance information of the light source element groups LG12, LG22, LG31, LG41, LG32, LG42 held by the light source driver 240 is luminance information B12(*k*), B22 (*k*), B31(*k*), B41(*k*), B32 (*k*), B42(*k*). The light source driver control circuit 170 maintains this luminance information.

The middle section of FIG. 25 shows a control example for the light-emission frame FL1 of the image frame FIk+1. As shown at the left of the illustration, the display driver 230 scans the scan line GL1 and thus updates the display in the scan area AR1 with the image data IM1(*k*+1). In the scan areas AR2, AR3, AR4, the image data IM2(*k*), IM3(*k*), IM4(*k*) are already displayed and these image data are maintained.

As shown at the right of the illustration, the light source driver control circuit 170 updates the luminance information of the light source element group LG12 held by the light source driver 240 with B12(*k*+1) and updates the luminance information of the light source element group LG22 with B22(*k*+1). The luminance information B12(*k*+1) and B22 (*k*+1) are dimmed, based on image data IM2(*k*+1). The luminance information of the light source element groups LG11, LG21, LG31, LG41, LG32, LG42 held by the light source driver 240 is the luminance information B11(*k*+1), B21(*k*+1), B31(*k*), B41(*k*), B32(*k*), B42(*k*). The light source driver control circuit 170 maintains this luminance information.

The bottom of FIG. 25 shows a control example for the light-emission frame FL2 of the image frame FIk+1. As shown at the left of the illustration, the display driver 230 scans the scan line GL2 and thus updates the display in the scan area AR2 with the image data IM2(*k*+1). In the scan areas AR1, AR3, AR4, the image data IM1(*k*+1), IM3(*k*), IM4(*k*) are already displayed and these image data are maintained.

As shown at the right of the illustration, the light source driver control circuit 170 updates the luminance information of the light source element group LG31 held by the light source driver 240 with B31(*k*+1) and updates the luminance information of the light source element group LG41 with B41(*k*+1). The luminance information B31(*k*+1) and B41 (*k*+1) are dimmed, based on image data IM3(*k*+1). The luminance information of the light source element groups LG11, LG21, LG12, LG22, LG32, LG42 held by the light source driver 240 is the luminance information B11(*k*+1), B21(*k*+1), B12(*k*+1), B22(*k*+1), B32 (*k*), B42(*k*). The light source driver control circuit 170 maintains this luminance information.

The top of FIG. 26 shows a control example for the light-emission frame FL3 of the image frame FIk+1. As shown at the left of the illustration, the display driver 230 scans the scan line GL3 and thus updates the display in the scan area AR3 with the image data IM3(*k*+1). In the scan areas AR1, AR2, AR4, the image data IM1(*k*+1), IM2(*k*+1), IM4(*k*) are already displayed and these image data are maintained.

As shown at the right of the illustration, the light source driver control circuit 170 updates the luminance information of the light source element group LG32 held by the light source driver 240 with B32(*k*+1) and updates the luminance information of the light source element group LG42 with B42(*k*+1). The luminance information B32(*k*+1) and B42 (*k*+1) are dimmed, based on image data IM4(*k*+1). The luminance information of the light source element groups LG11, LG21, LG12, LG22, LG31, LG41 held by the light source driver 240 is the luminance information B11(*k*+1), B21(*k*+1), B12(*k*+1), B22(*k*+1), B31 (k+1), B41(*k*+1). The light source driver control circuit 170 maintains this luminance information.

The bottom of FIG. 26 shows a control example for the light-emission frame FL4 of the image frame FIk+1. As shown at the left of the illustration, the display driver 230 scans the scan line GL4 and thus updates the display in the scan area AR4 with the image data IM4(*k*+1). In the scan areas AR1, AR2, AR3, the image data IM1(*k*+1), IM2(*k*+1), IM3(*k*+1) are already displayed and these image data are maintained.

As shown at the right of the illustration, the light source driver control circuit 170 updates the luminance information of the light source element group LG11 held by the light source driver 240 with B11(*k*+2) and updates the luminance information of the light source element group LG21 with B21(*k*+2). The luminance information B11(*k*+2) and B21 (*k*+2) are dimmed, based on image data IM1(*k*+2). The luminance information of the light source element groups LG12, LG22, LG31, LG41, LG32, LG42 held by the light source driver 240 is the luminance information B12(*k*+1), B22(*k*+1), B31(*k*+1), B41(*k*+1), B32(*k*+1), B42(*k*+1). The light source driver control circuit 170 maintains this luminance information.

Figure 27:
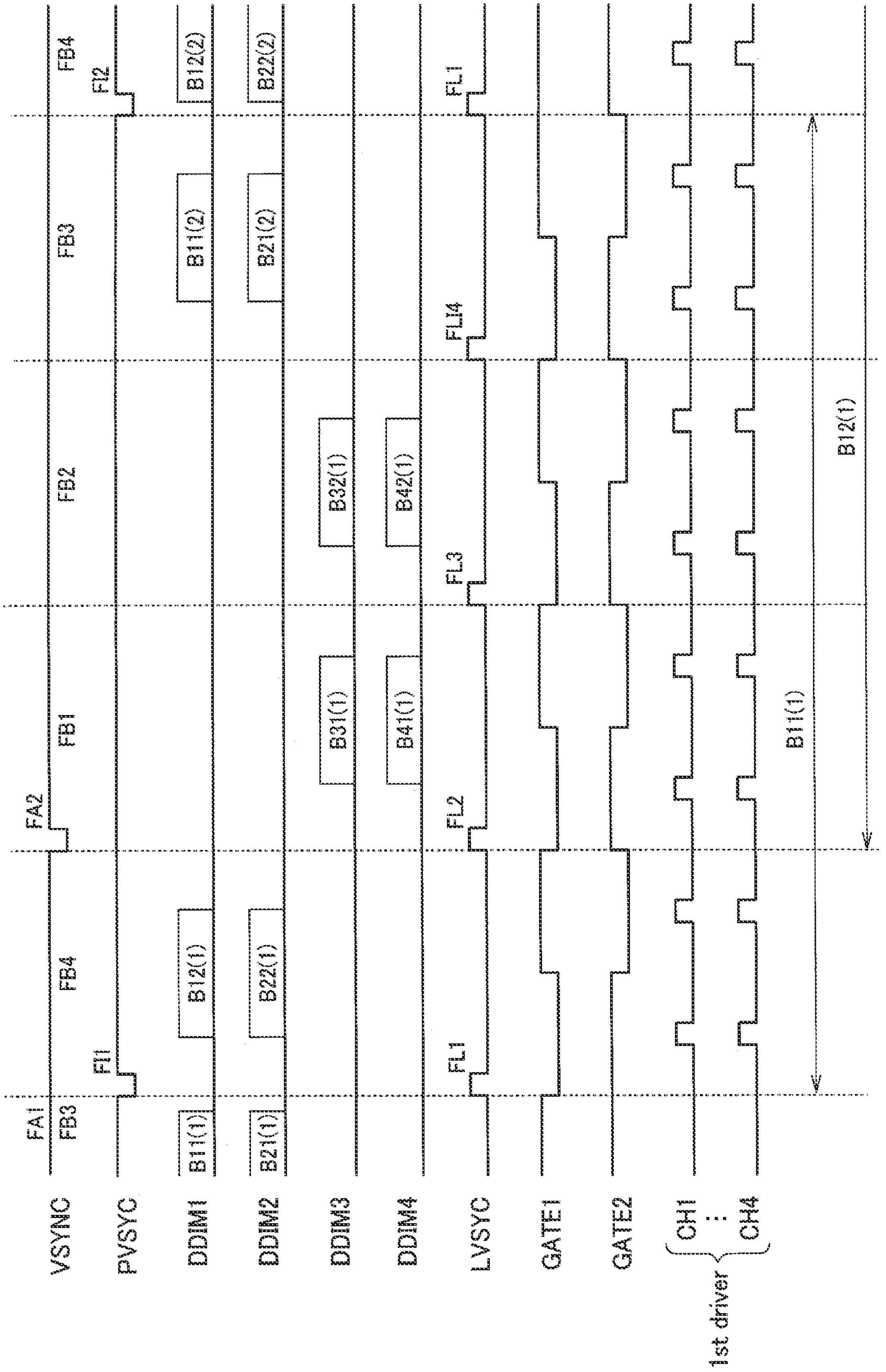
FIG. 27 shows a waveform example illustrating the timing control in the fourth detailed configuration example.

FIG. 27 shows a waveform example illustrating the timing control in the fourth detailed configuration example. In FIG. 27, the illustration of the horizontal synchronization signal, the image data, and the processing timing is omitted. Each of the division frames FB1 to FB4 is equivalent to one period of the horizontal synchronization signal HSYNC.

The timing control for the image data IM1(1) will now be described. In the division frame FB3, the light source driver control circuit 170 updates a part of the luminance information held by the first driver 241 with B11(1) and updates a part of the luminance information held by the second driver 242 with B21(1). The luminance information B11(1) and B21(1) are computed, based on the image data IM1(1) in the division frame FB2. In the division frame FB4, that is, in the light-emission frame FL1 of the image frame FI1, the display driver 230 updates the display in the scan area AR1 with the image-processed image data IM1(1).

In the light-emission frames FL1 to FL4 of the image frame FI1, the first driver 241 causes the light source element group LG11 to emit light, based on the luminance information B11(1). Although not illustrated in FIG. 27, the second driver 242 causes the light source element group LG21 to emit light, based on the luminance information B21(1).

The timing control for the image data IM2(1) will now be described. In the division frame FB4, that is, in the light-emission frame FL1 of the image frame FI1, the light source driver control circuit 170 updates a part of the luminance information held by the first driver 241 with B12(1) and updates a part of the luminance information held by the second driver 242 with B22(1). The luminance information B12(1) and B22(1) are computed, based on the image data IM2(1) in the division frame FB3. In the light-emission frame FL2, the display driver 230 updates the display in the scan area AR2 with the image-processed image data IM2(1).

In the light-emission frames FL2 to FL4 of the image frame FI1 and the light-emission frame FL1 of the image frame FI2, the first driver 241 causes the light source element group LG12 to emit light, based on the luminance information B12(1). Although not illustrated in FIG. 27, the second driver 242 causes the light source element group LG22 to emit light, based on the luminance information B22(1).

The timing control for the image data IM3(1) will now be described. In the division frame FB1 of the frame FA2, that is, in the light-emission frame FL2 of the image frame FI1, the light source driver control circuit 170 updates a part of the luminance information held by the third driver 243 with B31(1) and updates a part of the luminance information held by the fourth driver 244 with B41(1). The luminance information B31(1) and B41(1) are computed, based on the image data IM3(1) in the light-emission frame FL1. In the light-emission frame FL3, the display driver 230 updates the display in the scan area AR3 with the image-processed image data IM3(1).

Although not illustrated in FIG. 27, in the light-emission frames FL3 and FL4 of the image frame FI1 and the light-emission frames FL1 and FL2 of the image frame FI2, the third driver 243 causes the light source element group LG31 to emit light, based on the luminance information B31(1). The fourth driver 244 causes the light source element group LG41 to emit light, based on the luminance information B41(1).

The timing control for the image data IM4(1) will now be described. In the division frame FB2 of the frame FA2, that is, in the light-emission frame FL3 of the image frame FI1, the light source driver control circuit 170 updates a part of the luminance information held by the third driver 243 with B32(1) and updates a part of the luminance information held by the fourth driver 244 with B42(1). The luminance information B32(1) and B42(1) are computed, based on the image data IM4(1) in the light-emission frame FL2. In the light-emission frame FL4, the display driver 230 updates the display in the scan area AR4 with the image-processed image data IM4(1).

Although not illustrated in FIG. 27, in the light-emission frames FL4 of the image frame FI1 and the light-emission frames FL1 to FL3 of the image frame FI2, the third driver 243 causes the light source element group LG32 to emit light, based on the luminance information B32(1). The fourth driver 244 causes the light source element group LG42 to emit light, based on the luminance information B42(1).

7. Fifth Detailed Configuration Example and Example of Timing Control Therefor

Figure 28:
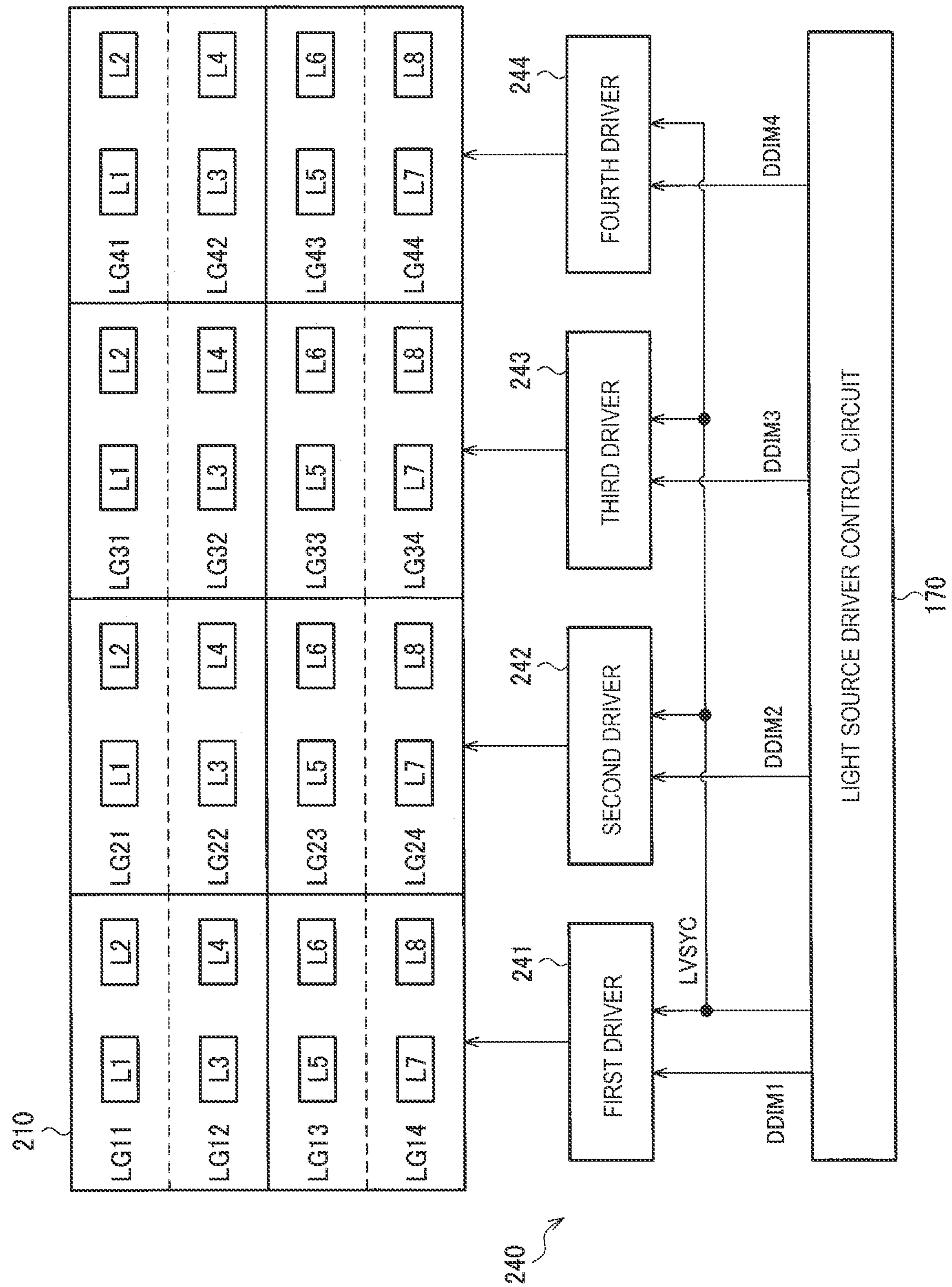
FIG. 28 shows a fifth detailed configuration example of the light source driver control circuit, the light source driver, and the backlight device.

FIG. 28 shows a fifth detailed configuration example of the light source driver control circuit, the light source driver, and the backlight device. This configuration example is an example where the area of the backlight which each driver of the light source driver is in charge of is vertically divided. In the description below, the differences from the first, second, third or fourth detailed configuration example are mainly described. The parts whose description is omitted are similar to those in the first, second, third or fourth detailed configuration example.

The backlight device 210 includes light source elements arranged in a matrix of four rows by eight columns. The light source driver 240 includes first to fourth drivers 241 to 244. One driver drives eight light source elements, which are defined as light source elements L1 to L8. Each driver drives light source elements in an area vertically divided into two columns in the backlight device 210. That is, the first driver 241 drives the light source element group LG11 in the first row, the light source element group LG12 in the second row, the light source element group LG13 in the third row, and the light source element group LG14 in the fourth row, in the first and second columns. The second driver 242 drives the light source element group LG21 in the first row, the light source element group LG22 in the second row, the light source element group LG23 in the third row, and the light source element group LG24 in the fourth row, in the third and fourth columns. The third driver 243 drives the light source element group LG31 in the first row, the light source element group LG32 in the second row, the light source element group LG33 in the third row, and the light source element group LG34 in the fourth row, in the fifth and sixth columns. The fourth driver 244 drives the light source element group LG41 in the first row, the light source element group LG42 in the second row, the light source element group LG43 in the third row, and the light source element group LG44 in the fourth row, in the seventh and eighth columns.

Figure 29:
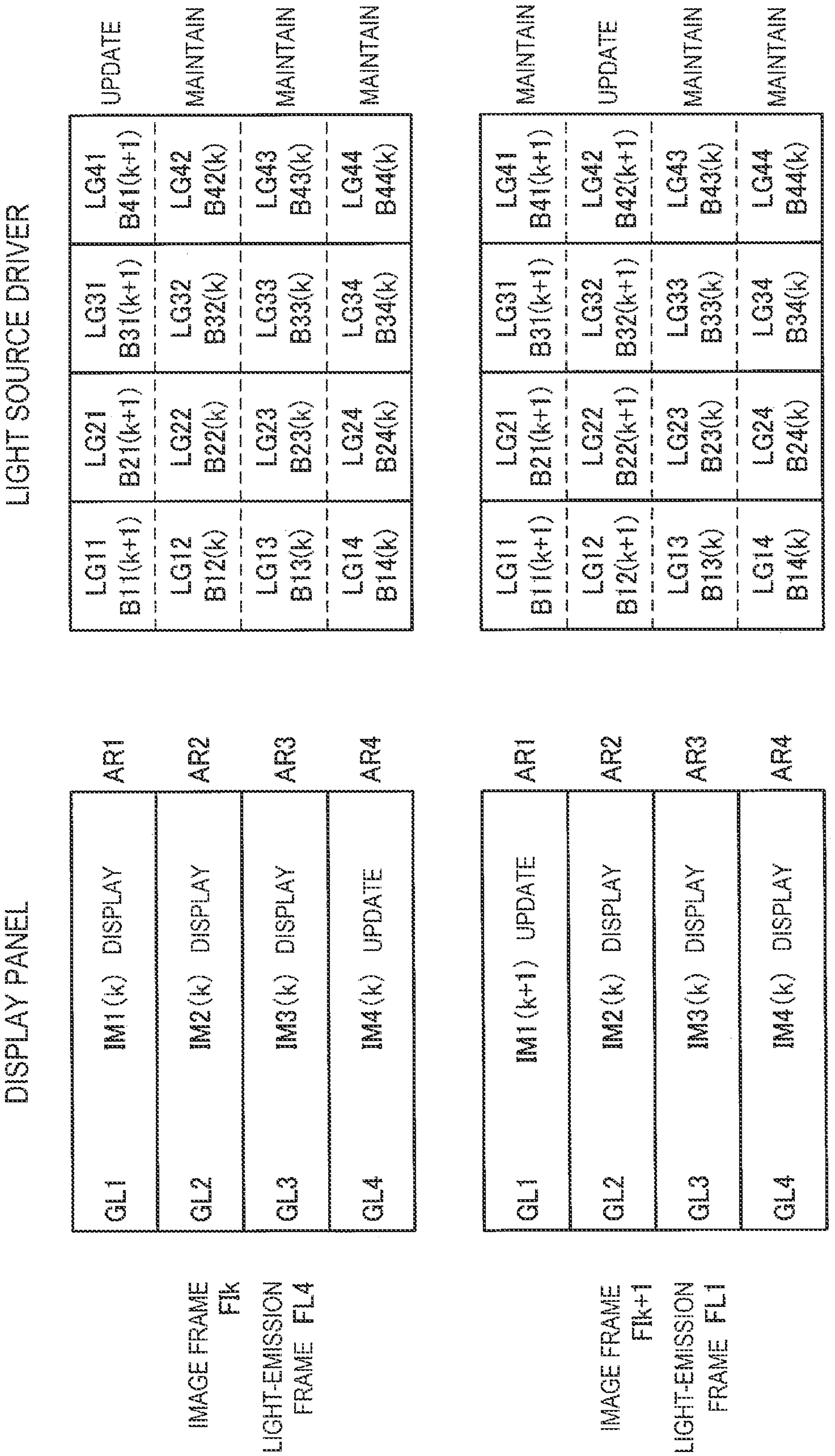
FIG. 29 explains timing control in the fifth detailed configuration example.
Figure 30:
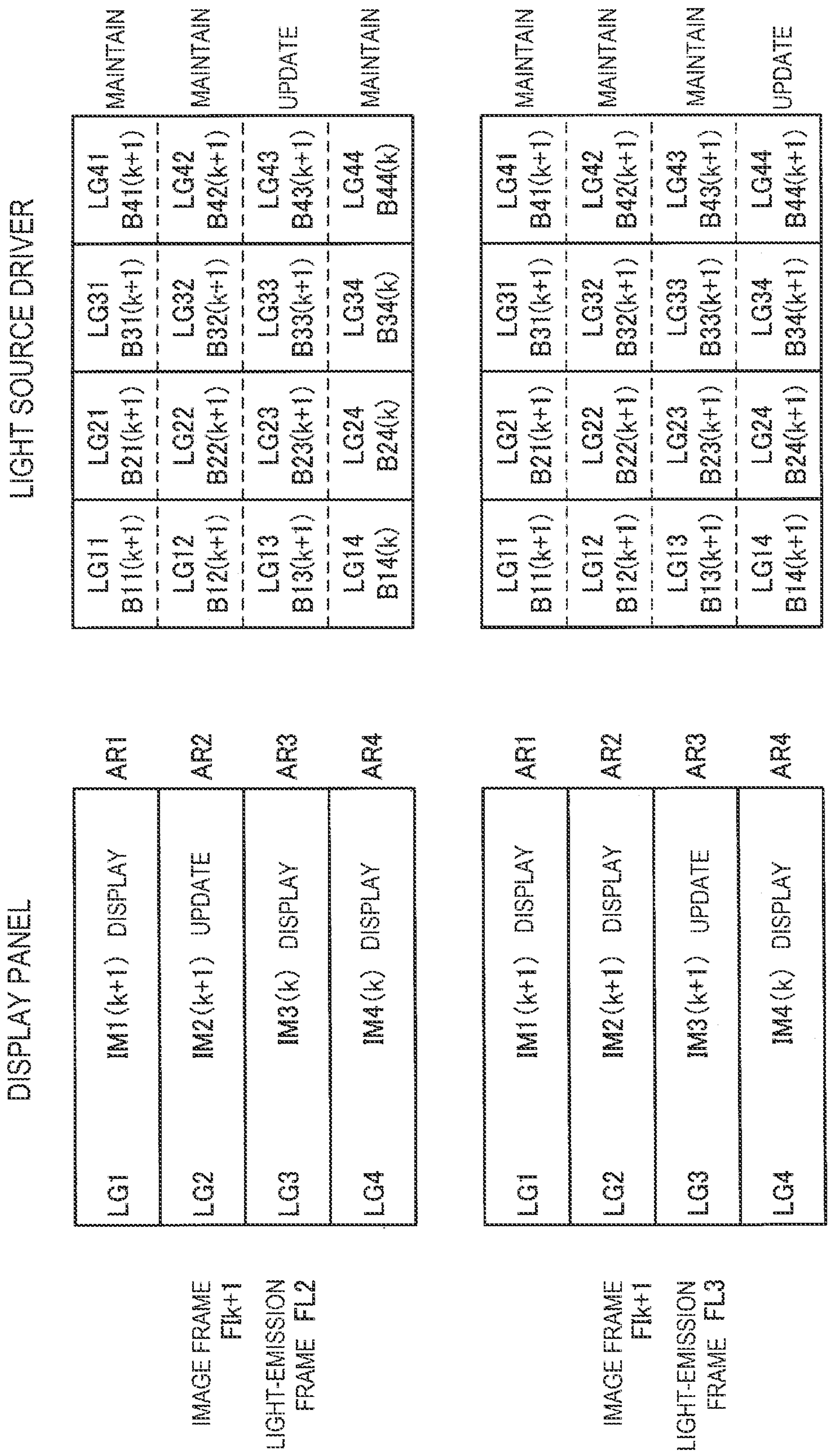
FIG. 30 explains the timing control in the fifth detailed configuration example.
Figure 31:
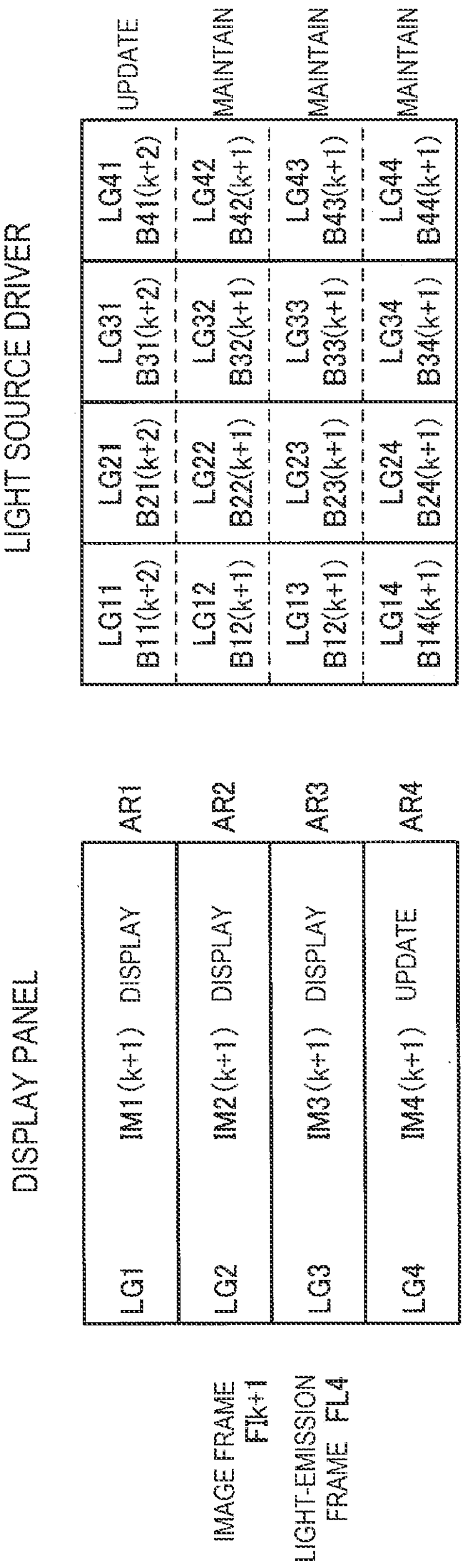
FIG. 31 explains the timing control in the fifth detailed configuration example.

FIGS. 29 to 31 explain the timing control in the fifth detailed configuration example.

The top of FIG. 29 shows a control example for the light-emission frame FL4 of the image frame FIk. As shown at the left of the illustration, in an example, the pixel array in the display panel 220 is formed of four scan lines GL1 to GL4. Each of the scan areas AR1 to AR4 is formed of one scan line.

The display driver 230 scans the scan line GL4 and thus updates the display in the scan area AR4 with the image data IM4(*k*). In the scan areas AR1, AR2, AR3, the image data IM1(*k*), IM2(*k*), IM3(*k*) are already displayed and these image data are maintained.

As shown at the left and right of the illustration, the light source element groups LG11 to LG41 of the backlight device 210 are arranged behind the scan line GL1 as viewed in a plan view of the display panel 220. Similarly, the light source element groups LG12 to LG42, LG13 to LG43, LG14 to LG44 of the backlight device 210 are arranged behind the scan lines GL2, GL3, GL4, respectively.

As shown at the right of the illustration, the light source driver control circuit 170 updates the luminance information of the light source element groups LG11 to LG41 held by the light source driver 240 with B11(*k*+1) to B41(*k*+1). The luminance information B11(*k*+1) to B41(*k*+1) are dimmed, based on image data IM1(*k*+1). The luminance information of the light source element groups LG12 to LG42, LG13 to LG43, LG14 to LG44 held by the light source driver 240 is luminance information B12(*k*) to B42(*k*), B13 (*k*) to B43 (*k*), B14 (*k*) to B44(*k*). The light source driver control circuit 170 maintains this luminance information.

The bottom of FIG. 29 shows a control example for the light-emission frame FL1 of the image frame FIk+1. As shown at the left of the illustration, the display driver 230 scans the scan line GL1 and thus updates the display in the scan area AR1 with the image data IM1(*k*+1). In the scan areas AR2, AR3, AR4, the image data IM2(*k*), IM3(*k*), IM4(*k*) are already displayed and these image data are maintained.

As shown at the right of the illustration, the light source driver control circuit 170 updates the luminance information of the light source element groups LG12 to LG42 held by the light source driver 240 with B12(*k*+1) to B42(*k*+1). The luminance information B12(*k*+1) to B42(*k*+1) are dimmed, based on image data IM2(*k*+1). The luminance information of the light source element groups LG11 to LG41, LG13 to LG43, LG14 to LG44 held by the light source driver 240 is the luminance information B11(*k*+1) to B41(*k*+1), B13(*k*) to B43(*k*), B14(*k*) to B44(*k*). The light source driver control circuit 170 maintains this luminance information.

The top of FIG. 30 shows a control example for the light-emission frame FL2 of the image frame FIk+1. As shown at the left of the illustration, the display driver 230 scans the scan line GL2 and thus updates the display in the scan area AR2 with the image data IM2(*k*+1). In the scan areas AR1, AR3, AR4, the image data IM1(*k*+1), IM3(*k*), IM4(*k*) are already displayed and these image data are maintained.

As shown at the right of the illustration, the light source driver control circuit 170 updates the luminance information of the light source element groups LG13 to LG43 held by the light source driver 240 with B13(*k*+1) to B43(*k*+1). The luminance information B13(*k*+1) to B43(*k*+1) are dimmed, based on image data IM3(*k*+1). The luminance information of the light source element groups LG11 to LG41, LG12 to LG42, LG14 to LG44 held by the light source driver 240 is the luminance information B11(*k*+1) to B41(*k*+1), B12 (k+1) to B42 (k+1), B14 (*k*) to B44(*k*). The light source driver control circuit 170 maintains this luminance information.

The bottom of FIG. 30 shows a control example for the light-emission frame FL3 of the image frame FIk+1. As shown at the left of the illustration, the display driver 230 scans the scan line GL3 and thus updates the display in the scan area AR3 with the image data IM3(*k*+1). In the scan areas AR1, AR2, AR4, the image data IM1(*k*+1), IM2(*k*+1), IM4(*k*) are already displayed and these image data are maintained.

As shown at the right of the illustration, the light source driver control circuit 170 updates the luminance information of the light source element groups LG14 to LG44 held by the light source driver 240 with B14(*k*+1) to B44(*k*+1). The luminance information B14(*k*+1) to B44(*k*+1) are dimmed, based on image data IM4(*k*+1). The luminance information of the light source element groups LG11 to LG41, LG12 to LG42, LG13 to LG43 held by the light source driver 240 is the luminance information B11(*k*+1) to B41(*k*+1), B12(*k*+1)

to B42(k+1), B13(k+1) to B43(k+1). The light source driver control circuit 170 maintains this luminance information.

FIG. 31 shows a control example for the light-emission frame FL4 of the image frame FIk+1. As shown at the left of the illustration, the display driver 230 scans the scan line GL4 and thus updates the display in the scan area AR4 with the image data IM4(k+1). In the scan areas AR1, AR2, AR3, the image data IM1(k+1), IM2(k+1), IM3(k+1) are already displayed and these image data are maintained.

As shown at the right of the illustration, the light source driver control circuit 170 updates the luminance information of the light source element groups LG11 to LG41 held by the light source driver 240 with B11(k+2) to B41(k+2). The luminance information B11(k+2) to B41(k+2) are dimmed, based on image data IM1(k+2). The luminance information of the light source element groups LG12 to LG42, LG13 to LG43, LG14 to LG44 held by the light source driver 240 is the luminance information B12(k+1) to B42(k+1), B13(k+1) to B43(k+1), B14(k+1) to B44(k+1). The light source driver control circuit 170 maintains this luminance information.

Figure 32:
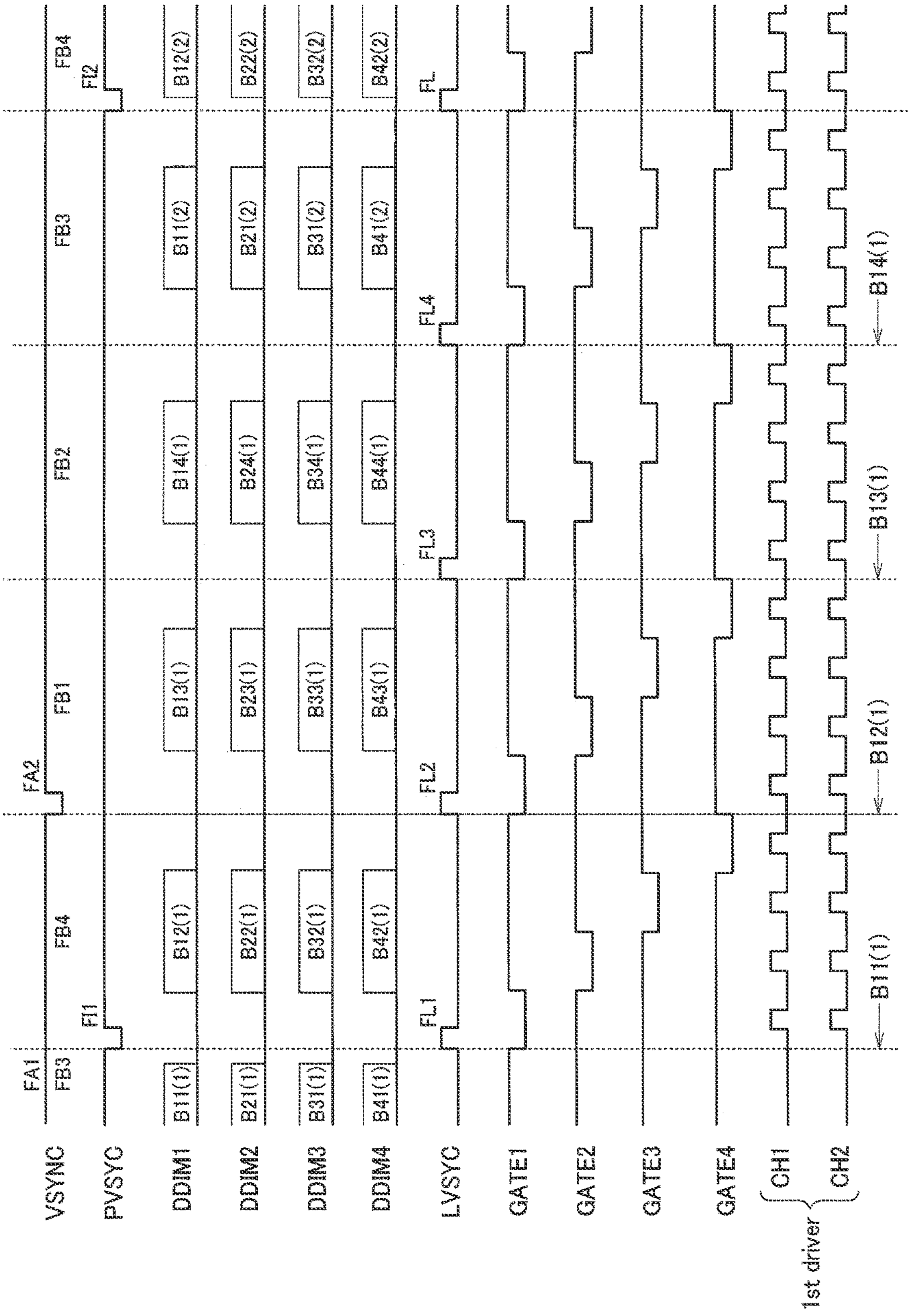
FIG. 32 shows a waveform example illustrating the timing control in the fifth detailed configuration example.

FIG. 32 shows a waveform example illustrating the timing control in the fifth detailed configuration example. In FIG. 32, the illustration of the horizontal synchronization signal, the image data, and the processing timing is omitted. Each of the division frames FB1 to FB4 is equivalent to one period of the horizontal synchronization signal HSYNC.

The timing control for the image data IM1(1) will now be described. In the division frame FB3, the light source driver control circuit 170 updates a part of the luminance information held by the first driver 241 with B11(1). Similarly, the light source driver control circuit 170 updates a part of the luminance information held by the second to fourth drivers 242 to 244 with B21(1) to B41(1). The luminance information B11(1) to B41(1) are computed, based on the image data IM1(1) in the division frame FB2. In the division frame FB4, that is, in the light-emission frame FL1 of the image frame FI1, the display driver 230 updates the display in the scan area AR1 with the image-processed image data IM1(1).

In the light-emission frames FL1 to FL4 of the image frame FI1, the first driver 241 causes the light source element group LG11 to emit light, based on the luminance information B11(1). Although not illustrated in FIG. 32, the second to fourth drivers 242 to 244 cause the light source element groups LG21 to LG41 to emit light, based on the luminance information B21(1) to B41(1).

The timing control for the image data IM2(1) will now be described. In the division frame FB4, that is, in the light-emission frame FL1 of the image frame FI1, the light source driver control circuit 170 updates a part of the luminance information held by the first driver 241 with B12(1). Similarly, the light source driver control circuit 170 updates a part of the luminance information held by the second to fourth drivers 242 to 244 with B22(1) to B42(1). The luminance information B12(1) to B42(1) are computed, based on the image data IM2(1) in the division frame FB3. In the light-emission frame FL2, the display driver 230 updates the display in the scan area AR2 with the image-processed image data IM2(1).

In the light-emission frames FL2 to FL4 of the image frame FI1 and the light-emission frame FL1 of the image frame FI2, the first driver 241 causes the light source element group LG12 to emit light, based on the luminance information B12(1). Although not illustrated in FIG. 32, the second to fourth drivers 242 to 244 cause the light source element groups LG22 to LG42 to emit light, based on the luminance information B22(1) to B42(1).

The timing control for the image data IM3(1) will now be described. In the division frame FB1 of the frame FA2, that is, in the light-emission frame FL2 of the image frame FI1, the light source driver control circuit 170 updates a part of the luminance information held by the first driver 241 with B13(1). Similarly, the light source driver control circuit 170 updates a part of the luminance information held by the second to fourth drivers 242 to 244 with B23(1) to B43(1). The luminance information B13(1) to B43(1) are computed, based on the image data IM3(1) in the light-emission frame FL1. In the light-emission frame FL3, the display driver 230 updates the display in the scan area AR3 with the image-processed image data IM3(1).

In the light-emission frames FL3 and FL4 of the image frame FI1 and the light-emission frames FL1 and FL2 of the image frame FI2, the first driver 241 causes the light source element group LG13 to emit light, based on the luminance information B13(1). Although not illustrated in FIG. 32, the second to fourth drivers 242 to 244 cause the light source element groups LG23 to LG43 to emit light, based on the luminance information B23(1) to B43(1).

The timing control for the image data IM4(1) will now be described. In the division frame FB2 of the frame FA2, that is, in the light-emission frame FL3 of the image frame FI1, the light source driver control circuit 170 updates a part of the luminance information held by the first driver 241 with B14(1). Similarly, the light source driver control circuit 170 updates a part of the luminance information held by the second to fourth drivers 242 to 244 with B24(1) to B44(1). The luminance information B14(1) to B44(1) are computed, based on the image data IM4(1) in the light-emission frame FL2. In the light-emission frame FL4, the display driver 230 updates the display in the scan area AR4 with the image-processed image data IM4(1).

In the light-emission frames FL4 of the image frame FI1 and the light-emission frames FL1 to FL3 of the image frame FI2, the first driver 241 causes the light source element group LG14 to emit light, based on the luminance information B14(1). Although not illustrated in FIG. 32, the second to fourth drivers 242 to 244 cause the light source element groups LG24 to LG44 to emit light, based on the luminance information B24(1) to B44(1).

The embodiment has been described above in detail. However, a person skilled in the art can readily understand that various modifications can be made without substantially departing from the new matters and effects of the present disclosure. Therefore, all such modification examples are included in the scope of the present disclosure. For example, a term described along with a different term having a broader meaning or the same meaning, at least once in the specification or the drawings, can be replaced with the different term at any point in the specification or the drawings. Also, all combinations of the embodiment and modification examples are included in the scope of the present disclosure. The configurations and operations or the like of the display controller, the display system, the display device, the processing device, and the electronic device or the like are not limited to those described in the embodiment and can be implemented with various modifications.

What is claimed is:

1. A display system comprising:

a display driver that drives a display panel of a display device including the display panel and a backlight device;

a light source driver that drives the backlight device having a plurality of light source elements, based on luminance information that sets a luminance of the plurality of light source elements; and a display controller configured to:

control the display driver and the light source driver;

perform dimming processing based on image analysis of inputted image data and output the luminance information acquired as a result of the dimming processing to the light source driver; and perform image processing on the inputted image data and output image-processed image data to the display driver, wherein the light source driver causes the plurality of light source elements to emit light, based on a light-emission frame update that is faster than an image frame update on the display panel by the display driver, and when the light source driver causes the plurality of light source elements to emit light in an i-th light-emission frame, where i is an integer equal to or greater than 1, the luminance information of the light source element corresponding to a scan area scanned by the display driver in the i-th light-emission frame, of the plurality of light source elements, is updated, based on the image-processed image data in the scan area at a timing before the i-th light-emission frame.

2. The display system according to claim 1, wherein the light source driver performs the image frame update in first to n-th light-emission frames, where n is an integer equal to or greater than 2, in one image frame of the image frame update, and when areas scanned by the display driver in the first to n-th light-emission frames are first to n-th scan areas, in an (i−1)th light-emission frame preceding the i-th light-emission frame, where i is an integer equal to or greater than 2 and equal to or smaller than n, the luminance information of the light source element corresponding to the i-th scan area is updated, based on the image-processed image data in the i-th scan area, of the first to n-th scan areas, and the luminance information of the light source element corresponding to the scan area other than the i-th scan area, of the first to n-th scan areas, is maintained.

3. The display system according to claim 2, wherein the display controller performs the update of the luminance information of the light source element corresponding to the i-th scan area, to the light source driver, based on the image-processed image data in the i-th scan area, in the (i−1)th light-emission frame.

4. The display system according to claim 1, wherein the display controller:

outputs, to the display driver, a first vertical synchronization signal that becomes active synchronously with a timing of the image frame update, and; and outputs, to the light source driver, a second vertical synchronization signal that becomes active synchronously with a timing of the light-emission frame update and that has a faster rate than a rate of the first vertical synchronization signal.

5. The display system according to claim 4, wherein the second vertical synchronization signal becomes active at first to n-th timings, where n is an integer equal to or greater than 2, in one image frame of the image frame update, the display driver scans an i-th scan area on the display panel in the i-th light-emission frame, which is a period between an i-th timing, where i is an integer equal to or greater than 2 and equal to or smaller than n, and a next timing, of the first to n-th timings, and the display controller performs the update of the luminance information of the light source element corresponding to the i-th scan area, based on the image-processed image data in the i-th scan area, in an (i−1)th light-emission frame, which is a period between an (i−1)th timing and the i-th timing, of the first to n-th timings.

6. The display system according to claim 1, wherein the light source driver includes a plurality of drivers, and the display controller performs the update of the luminance information to the driver driving the light source element corresponding to the scan area, of the plurality of drivers, at a timing before the i-th light-emission frame.

7. The display system according to claim 1, wherein the dimming processing is local dimming processing or global dimming processing.

8. An electronic device comprising:

the display system according to claim 1, and the display device.

9. A display system comprising:

a display driver that drives a display panel of a display device including the display panel and a backlight device;

a light source driver that drives the backlight device having a plurality of light source elements, based on luminance information that sets a luminance of the plurality of light source elements; and a display controller that controls the display driver and the light source driver, wherein the light source driver causes the plurality of light source elements to emit light, based on a light-emission frame update that is faster than an image frame update on the display panel by the display driver, when the light source driver causes the plurality of light source elements to emit light in an i-th light-emission frame, where i is an integer equal to or greater than 1, the luminance information of the light source element corresponding to a scan area scanned by the display driver in the i-th light-emission frame, of the plurality of light source elements, is updated, based on image data in the scan area at a timing before the i-th light-emission frame, the display controller:

outputs, to the display driver, a first vertical synchronization signal that becomes active synchronously with a timing of the image frame update; and outputs, to the light source driver, a second vertical synchronization signal that becomes active synchronously with a timing of the light-emission frame update and that has a faster rate than a rate of the first vertical synchronization signal, the second vertical synchronization signal becomes active at first to n-th timings, where n is an integer equal to or greater than 2, in one image frame of the image frame update, the display driver scans an i-th scan area on the display panel in the i-th light-emission frame, which is a period between an i-th timing, where i is an integer equal to or greater than 2 and equal to or smaller than n, and a next timing, of the first to n-th timings, and the display controller performs the update of the luminance information of the light source element corresponding to the i-th scan area, based on the image data in the i-th scan area, in an (i−1)th light-emission frame, which is a period between an (i−1)th timing and the i-th timing, of the first to n-th timings.

10. A display system comprising:

a display driver that drives a display panel of a display device including the display panel and a backlight device;

a light source driver that drives the backlight device having a plurality of light source elements, based on luminance information that sets a luminance of the plurality of light source elements; and a display controller that controls the display driver and the light source driver, wherein the light source driver causes the plurality of light source elements to emit light, based on a light-emission frame update that is faster than an image frame update on the display panel by the display driver, when the light source driver causes the plurality of light source elements to emit light in an i-th light-emission frame, where i is an integer equal to or greater than 1, the luminance information of the light source element corresponding to a scan area scanned by the display driver in the i-th light-emission frame, of the plurality of light source elements, is updated, based on image data in the scan area at a timing before the i-th light-emission frame, the light source driver includes a plurality of drivers, and the display controller performs the update of the luminance information to the driver driving the light source element corresponding to the scan area, of the plurality of drivers, at a timing before the i-th light-emission frame.

* * * * *